(12) United States Patent
Kshatriya

(10) Patent No.: US 8,596,391 B2
(45) Date of Patent: Dec. 3, 2013

(54) METHOD OF CONVERTING VEHICLE INTO HYBRID VEHICLE

(75) Inventor: Tejas Krishna Kshatriya, Pune (IN)

(73) Assignee: KPIT Cummins Infosystems Ltd, Pune (IN)

(*) Notice: Subject to any disclaimer, the term of this patent is extended or adjusted under 35 U.S.C. 154(b) by 235 days.

(21) Appl. No.: 12/882,006

(22) Filed: Sep. 14, 2010

(65) Prior Publication Data
US 2011/0083309 A1    Apr. 14, 2011

(30) Foreign Application Priority Data

| Sep. 15, 2009 | (IN) | ......................... 2108/MUM/2009 |
| Sep. 15, 2009 | (IN) | ......................... 2109/MUM/2009 |
| Nov. 15, 2009 | (WO) | ................. PCT/IN2009/000655 |
| Nov. 15, 2009 | (WO) | ................. PCT/IN2009/000656 |
| Apr. 30, 2010 | (IN) | ......................... 1386/MUM/2010 |

(51) Int. Cl.
*B60K 6/22* (2007.10)

(52) U.S. Cl.
USPC ................... 180/65.22; 180/65.1; 29/401.1

(58) Field of Classification Search
USPC .......... 29/401.1, 402.08, 888.011; 180/65.22, 180/65.1; 474/84
See application file for complete search history.

(56) References Cited

U.S. PATENT DOCUMENTS

| 1,402,250 | A | * | 1/1922 | Pieper ........................ 290/19 |
| 2,407,935 | A | | 9/1946 | Perfetti et al. |
| 4,165,795 | A | | 8/1979 | Lynch et al. |
| 4,192,279 | A | | 3/1980 | Maisch et al. |
| 4,242,922 | A | | 1/1981 | Baudoin |
| 4,286,683 | A | | 9/1981 | Zeigner et al. |
| 4,296,362 | A | | 10/1981 | Beasley |
| 4,405,029 | A | | 9/1983 | Hunt |
| 4,413,218 | A | | 11/1983 | Taylor et al. |
| 4,494,497 | A | | 1/1985 | Uchida et al. |
| 4,534,326 | A | | 8/1985 | Bowcott |
| 4,749,933 | A | | 6/1988 | Ben-Aaron |

(Continued)

FOREIGN PATENT DOCUMENTS

| CA | 2245438 | 2/1999 |
| CA | 2554678 A1 | 1/2008 |

(Continued)

OTHER PUBLICATIONS

Cooper et al., "The UltraBattery—A new battery design for a new beginning in hybrid electric vehicle energy storage", Journal of Power Sources, vol. 188, Issue 2, Mar. 15, 2009, pp. 642-649.

(Continued)

*Primary Examiner* — Minh Trinh
(74) *Attorney, Agent, or Firm* — Foley & Lardner LLP

(57) ABSTRACT

A method of converting a vehicle having an internal combustion engine, a transmission, an alternator and a battery into a hybrid vehicle is disclosed. The method comprises installing an electric motor to the vehicle that is configured to assist the internal combustion engine in rotating a crankshaft of the internal combustion engine, installing an energy storage element configured to provide power to the electric motor, installing a motor control unit configured to control the amount of power delivered from the energy storage element to the electric motor and replacing an existing pulley on a crankshaft of the internal combustion engine with a new pulley configured to receive a first belt extending between the new pulley and an alternator pulley and a second belt extending between the new pulley and an electric motor pulley.

18 Claims, 19 Drawing Sheets

(56) References Cited

U.S. PATENT DOCUMENTS

| | | | |
|---|---|---|---|
| 4,787,043 A | 11/1988 | Zimmerman et al. | |
| 4,883,028 A | 11/1989 | Wu | |
| 4,926,335 A | 5/1990 | Flowers et al. | |
| 5,179,335 A | 1/1993 | Nor | |
| 5,180,279 A * | 1/1993 | McLane-Goetz et al. | 415/177 |
| 5,191,766 A * | 3/1993 | Vines | 60/619 |
| 5,249,637 A | 10/1993 | Heidl et al. | |
| 5,263,379 A * | 11/1993 | Newbigging et al. | 74/336 R |
| 5,278,759 A | 1/1994 | Berra et al. | |
| 5,321,597 A | 6/1994 | Alacoque | |
| 5,321,979 A | 6/1994 | Mc Kendry et al. | |
| 5,343,970 A | 9/1994 | Severinsky | |
| 5,403,244 A | 4/1995 | Tankersley et al. | |
| 5,420,471 A | 5/1995 | Yun | |
| 5,451,820 A | 9/1995 | Gotoh et al. | |
| 5,473,227 A | 12/1995 | Arnaud et al. | |
| 5,500,584 A | 3/1996 | Shimomoto | |
| 5,542,390 A | 8/1996 | Hartman et al. | |
| 5,587,619 A | 12/1996 | Yumiyama et al. | |
| 5,596,317 A | 1/1997 | Brinkmeyer et al. | |
| 5,644,181 A | 7/1997 | Kooken et al. | |
| 5,653,659 A | 8/1997 | Kunibe et al. | |
| 5,661,379 A | 8/1997 | Johnson | |
| 5,675,645 A | 10/1997 | Schwartz et al. | |
| 5,680,031 A | 10/1997 | Pavlovic et al. | |
| 5,712,969 A | 1/1998 | Zimmermann et al. | |
| 5,721,375 A | 2/1998 | Bidner | |
| 5,765,656 A | 6/1998 | Weaver | |
| 5,781,869 A * | 7/1998 | Parlett et al. | 701/1 |
| 5,786,640 A | 7/1998 | Sakai | |
| 5,815,824 A | 9/1998 | Saga et al. | |
| 5,832,896 A | 11/1998 | Phipps | |
| 5,862,497 A | 1/1999 | Yano et al. | |
| 5,862,507 A | 1/1999 | Wu et al. | |
| 5,892,346 A | 4/1999 | Moroto et al. | |
| 5,927,415 A | 7/1999 | Ibaraki et al. | |
| 6,018,199 A | 1/2000 | Shiroyama et al. | |
| 6,022,048 A | 2/2000 | Harshbarger et al. | |
| 6,026,921 A | 2/2000 | Aoyama et al. | |
| 6,037,751 A | 3/2000 | Klang | |
| 6,044,923 A | 4/2000 | Reagan et al. | |
| 6,083,138 A | 7/2000 | Aoyama et al. | |
| 6,104,971 A | 8/2000 | Fackler | |
| 6,137,203 A | 10/2000 | Jermakian et al. | |
| 6,209,672 B1 | 4/2001 | Severinsky | |
| 6,234,932 B1 | 5/2001 | Kuroda et al. | |
| 6,247,465 B1 | 6/2001 | Sprunger | |
| 6,257,214 B1 | 7/2001 | Bidner et al. | |
| 6,267,706 B1 | 7/2001 | Kuroda et al. | |
| 6,269,290 B1 | 7/2001 | Egami et al. | |
| 6,275,759 B1 | 8/2001 | Nakajima et al. | |
| 6,278,213 B1 | 8/2001 | Bradfield | |
| 6,278,915 B1 | 8/2001 | Deguchi et al. | |
| 6,294,843 B1 | 9/2001 | Kato et al. | |
| 6,295,487 B1 | 9/2001 | Ono et al. | |
| 6,307,277 B1 | 10/2001 | Tamai et al. | |
| 6,314,347 B1 | 11/2001 | Kuroda et al. | |
| 6,315,068 B1 | 11/2001 | Hoshiya et al. | |
| 6,316,842 B1 | 11/2001 | Kuroda et al. | |
| 6,327,852 B1 | 12/2001 | Hirose | |
| 6,333,612 B1 | 12/2001 | Suzuki et al. | |
| 6,343,252 B1 * | 1/2002 | Asami et al. | 701/113 |
| 6,347,608 B1 | 2/2002 | Hara et al. | |
| 6,367,570 B1 | 4/2002 | Long, III et al. | |
| 6,376,927 B1 | 4/2002 | Tamai et al. | |
| 6,380,640 B1 | 4/2002 | Kanamori et al. | |
| 6,422,972 B1 | 7/2002 | Eguchi | |
| 6,427,797 B1 | 8/2002 | Chang | |
| 6,446,745 B1 | 9/2002 | Lee et al. | |
| 6,452,286 B1 | 9/2002 | Kubo et al. | |
| 6,463,900 B1 | 10/2002 | Wakabayashi et al. | |
| 6,464,026 B1 | 10/2002 | Horsley et al. | |
| 6,476,532 B1 | 11/2002 | Kennamer | |
| 6,490,491 B1 | 12/2002 | Hartmann et al. | |
| 6,546,455 B1 | 4/2003 | Hurich et al. | |
| 6,555,265 B1 | 4/2003 | Fleming et al. | |
| 6,591,758 B2 | 7/2003 | Kumar | |
| 6,616,569 B2 | 9/2003 | Hoang et al. | |
| 6,617,703 B2 | 9/2003 | Matsubara et al. | |
| 6,622,804 B2 | 9/2003 | Schmitz et al. | |
| 6,655,485 B1 | 12/2003 | Ito et al. | |
| 6,657,315 B1 | 12/2003 | Peters et al. | |
| 6,672,415 B1 | 1/2004 | Tabata | |
| 6,674,198 B2 | 1/2004 | Gubbels | |
| 6,675,078 B2 | 1/2004 | Bitzer et al. | |
| 6,701,880 B1 | 3/2004 | Gauthier et al. | |
| 6,717,378 B2 | 4/2004 | Kitajima et al. | |
| 6,746,366 B2 | 6/2004 | Tamor | |
| 6,769,400 B1 | 8/2004 | Ament | |
| 6,781,251 B2 | 8/2004 | Takaoka et al. | |
| 6,819,169 B1 | 11/2004 | Kunc et al. | |
| 6,823,840 B1 | 11/2004 | Tamai et al. | |
| 6,861,820 B2 | 3/2005 | Gale et al. | |
| 6,876,098 B1 | 4/2005 | Gray, Jr. | |
| 6,930,413 B2 | 8/2005 | Marzano | |
| 7,013,213 B2 | 3/2006 | McGee et al. | |
| 7,028,795 B2 | 4/2006 | Tabata | |
| 7,030,580 B2 | 4/2006 | Hoff | |
| 7,056,251 B2 | 6/2006 | Ibaraki | |
| 7,058,487 B2 | 6/2006 | Hara et al. | |
| 7,130,731 B2 | 10/2006 | Itoh et al. | |
| 7,147,070 B2 | 12/2006 | Leclerc | |
| 7,221,125 B2 | 5/2007 | Ding | |
| 7,226,383 B2 | 6/2007 | Namba | |
| 7,235,029 B2 | 6/2007 | Klemen et al. | |
| 7,268,442 B2 | 9/2007 | Syed et al. | |
| 7,272,484 B1 | 9/2007 | Maeda et al. | |
| 7,276,806 B1 | 10/2007 | Sheidler et al. | |
| 7,295,915 B1 | 11/2007 | Okubo et al. | |
| 7,302,335 B1 | 11/2007 | Xiao et al. | |
| 7,360,615 B2 | 4/2008 | Salman et al. | |
| 7,389,837 B2 | 6/2008 | Tamai et al. | |
| 7,436,081 B2 | 10/2008 | Lane | |
| 7,466,058 B2 | 12/2008 | Dubois et al. | |
| 7,482,767 B2 | 1/2009 | Tether | |
| 7,520,350 B2 | 4/2009 | Hotto | |
| 7,539,562 B2 | 5/2009 | Maguire et al. | |
| 7,554,827 B2 | 6/2009 | Wang | |
| 7,559,386 B2 | 7/2009 | Gu et al. | |
| 7,559,387 B2 | 7/2009 | Tamai | |
| 7,595,606 B2 | 9/2009 | Loubeyre | |
| 7,600,595 B2 | 10/2009 | Harris | |
| 7,610,143 B1 | 10/2009 | Boesch | |
| 7,681,676 B2 | 3/2010 | Kydd | |
| 7,740,092 B2 * | 6/2010 | Bender | 180/65.29 |
| 7,874,395 B2 * | 1/2011 | Taji et al. | 180/300 |
| 7,992,662 B2 * | 8/2011 | King et al. | 180/65.22 |
| 8,122,986 B2 | 2/2012 | Colvin et al. | |
| 2001/0022245 A1 | 9/2001 | Rogg | |
| 2002/0007975 A1 | 1/2002 | Naito et al. | |
| 2002/0035429 A1 | 3/2002 | Banas | |
| 2002/0069000 A1 | 6/2002 | Nakao | |
| 2002/0074173 A1 | 6/2002 | Morimoto et al. | |
| 2002/0096886 A1 | 7/2002 | Schmitz et al. | |
| 2002/0108794 A1 | 8/2002 | Wakashiro et al. | |
| 2002/0116112 A1 | 8/2002 | Wakashiro et al. | |
| 2002/0144848 A1 | 10/2002 | Schulte | |
| 2002/0179047 A1 | 12/2002 | Hoang et al. | |
| 2002/0179351 A1 | 12/2002 | Shimabukuro et al. | |
| 2002/0185107 A1 | 12/2002 | Kubesh et al. | |
| 2002/0195885 A1 | 12/2002 | Tsuneyoshi et al. | |
| 2003/0009269 A1 | 1/2003 | Graf et al. | |
| 2003/0010548 A1 | 1/2003 | Mesiti et al. | |
| 2003/0087724 A1 | 5/2003 | Seibertz et al. | |
| 2003/0094317 A1 | 5/2003 | Takizawa et al. | |
| 2003/0098204 A1 | 5/2003 | Mogi | |
| 2003/0144773 A1 | 7/2003 | Sumitomo | |
| 2003/0173124 A1 | 9/2003 | Okada et al. | |
| 2003/0178896 A1 | 9/2003 | Crane | |
| 2003/0236611 A1 | 12/2003 | James et al. | |
| 2004/0030471 A1 | 2/2004 | Faye | |
| 2004/0046525 A1 | 3/2004 | Gale et al. | |
| 2004/0152558 A1 | 8/2004 | Takami et al. | |
| 2004/0160141 A1 | 8/2004 | Dube | |

(56) References Cited

U.S. PATENT DOCUMENTS

| | | |
|---|---|---|
| 2004/0169497 A1 | 9/2004 | Colley |
| 2005/0027413 A1 | 2/2005 | Kuroda et al. |
| 2005/0065703 A1 | 3/2005 | Assaf et al. |
| 2005/0079068 A1 | 4/2005 | Shigematsu |
| 2005/0079951 A1 | 4/2005 | Gonzalez |
| 2005/0120785 A1 | 6/2005 | Shin |
| 2005/0137770 A1 | 6/2005 | Hosler et al. |
| 2005/0165522 A1 | 7/2005 | Lehner et al. |
| 2005/0200463 A1 | 9/2005 | Situ et al. |
| 2005/0228553 A1 | 10/2005 | Tryon |
| 2005/0235743 A1 | 10/2005 | Stempnik et al. |
| 2005/0235955 A1 | 10/2005 | Katrak et al. |
| 2005/0240338 A1 | 10/2005 | Ardisana |
| 2005/0274553 A1 | 12/2005 | Salman et al. |
| 2006/0000650 A1 | 1/2006 | Hughey |
| 2006/0017347 A1 | 1/2006 | Rahman |
| 2006/0030450 A1* | 2/2006 | Kyle .................. 477/3 |
| 2006/0055275 A1 | 3/2006 | Shim et al. |
| 2006/0069490 A1 | 3/2006 | Mladenovic et al. |
| 2006/0113127 A1 | 6/2006 | Dong et al. |
| 2006/0113129 A1 | 6/2006 | Tabara |
| 2006/0166783 A1 | 7/2006 | Tamai et al. |
| 2006/0186738 A1 | 8/2006 | Noguchi et al. |
| 2006/0217229 A1 | 9/2006 | Ogata |
| 2006/0235588 A1 | 10/2006 | Krimmer et al. |
| 2006/0283642 A1 | 12/2006 | Hickam |
| 2006/0290216 A1 | 12/2006 | Burse |
| 2007/0061024 A1 | 3/2007 | Ceskutti |
| 2007/0095587 A1* | 5/2007 | DuCharme .................. 180/65.3 |
| 2007/0096683 A1* | 5/2007 | Izumi et al. .................. 318/801 |
| 2007/0112496 A1 | 5/2007 | Ji |
| 2007/0141465 A1 | 6/2007 | Honbo et al. |
| 2007/0161455 A1 | 7/2007 | King et al. |
| 2007/0162200 A1 | 7/2007 | Zillmer et al. |
| 2007/0163819 A1 | 7/2007 | Richter et al. |
| 2007/0169970 A1 | 7/2007 | Kydd |
| 2007/0175681 A1 | 8/2007 | King et al. |
| 2007/0184928 A1* | 8/2007 | Yasui et al. .................. 475/5 |
| 2007/0208467 A1 | 9/2007 | Maguire et al. |
| 2007/0210743 A1 | 9/2007 | Tabei et al. |
| 2007/0222408 A1 | 9/2007 | Hughes |
| 2007/0240922 A1 | 10/2007 | Kikuchi |
| 2007/0251748 A1 | 11/2007 | Downs et al. |
| 2007/0275819 A1 | 11/2007 | Hirata |
| 2007/0284164 A1 | 12/2007 | Hamstra et al. |
| 2007/0298928 A1 | 12/2007 | Yamanaka et al. |
| 2008/0004780 A1 | 1/2008 | Watanabe et al. |
| 2008/0021628 A1 | 1/2008 | Tryon |
| 2008/0058154 A1 | 3/2008 | Ashizawa et al. |
| 2008/0060859 A1 | 3/2008 | Klemen et al. |
| 2008/0093136 A1 | 4/2008 | Miller |
| 2008/0093143 A1 | 4/2008 | Harrison |
| 2008/0116759 A1 | 5/2008 | Lin |
| 2008/0121211 A1 | 5/2008 | Livshiz et al. |
| 2008/0149079 A1 | 6/2008 | Jefford et al. |
| 2008/0156550 A1 | 7/2008 | Wei et al. |
| 2008/0204289 A1 | 8/2008 | Miettinen |
| 2008/0210187 A1 | 9/2008 | Sugano et al. |
| 2008/0236910 A1 | 10/2008 | Kejha et al. |
| 2008/0236917 A1 | 10/2008 | Abe et al. |
| 2008/0264398 A1 | 10/2008 | Schondorf et al. |
| 2008/0276610 A1 | 11/2008 | McDowell |
| 2008/0278117 A1 | 11/2008 | Tarchinski |
| 2008/0288153 A1 | 11/2008 | Bauerle et al. |
| 2008/0306643 A1 | 12/2008 | Hanyu et al. |
| 2008/0318728 A1 | 12/2008 | Soliman et al. |
| 2008/0319594 A1 | 12/2008 | Shibata et al. |
| 2008/0319596 A1 | 12/2008 | Yamada |
| 2009/0018716 A1 | 1/2009 | Ambrosio |
| 2009/0024263 A1 | 1/2009 | Simon et al. |
| 2009/0026876 A1 | 1/2009 | Atkinson et al. |
| 2009/0062050 A1* | 3/2009 | Hayashi .................. 474/167 |
| 2009/0079394 A1 | 3/2009 | Richards et al. |
| 2009/0096423 A1 | 4/2009 | Aswani et al. |
| 2009/0115282 A1 | 5/2009 | Nishidate et al. |
| 2009/0120700 A1 | 5/2009 | Fukumura |
| 2009/0127008 A1 | 5/2009 | Batdorf |
| 2009/0128069 A1 | 5/2009 | Kaneko et al. |
| 2009/0143950 A1 | 6/2009 | Hasegawa et al. |
| 2009/0150055 A1* | 6/2009 | Kaiser et al. .................. 701/105 |
| 2009/0150059 A1 | 6/2009 | Santoso et al. |
| 2009/0171522 A1 | 7/2009 | Luo et al. |
| 2009/0187305 A1 | 7/2009 | Krauter et al. |
| 2009/0198398 A1 | 8/2009 | Yamada |
| 2009/0204280 A1 | 8/2009 | Simon, Jr. et al. |
| 2009/0223725 A1 | 9/2009 | Rodriguez et al. |
| 2009/0230900 A1 | 9/2009 | Bae et al. |
| 2009/0255741 A1 | 10/2009 | Major et al. |
| 2009/0295451 A1 | 12/2009 | Jordanger et al. |
| 2009/0314109 A1 | 12/2009 | Tu |
| 2009/0322503 A1 | 12/2009 | Suzuki et al. |
| 2009/0325068 A1 | 12/2009 | Boden et al. |
| 2009/0326750 A1 | 12/2009 | Ang |
| 2010/0009263 A1 | 1/2010 | Gerber |
| 2010/0044129 A1 | 2/2010 | Kyle |
| 2010/0052888 A1 | 3/2010 | Crowe et al. |
| 2010/0057280 A1 | 3/2010 | Crowe et al. |
| 2010/0057281 A1 | 3/2010 | Lawyer et al. |
| 2010/0060236 A1 | 3/2010 | Delaille et al. |
| 2010/0139998 A1 | 6/2010 | Schondorf |
| 2010/0222953 A1 | 9/2010 | Tang |
| 2010/0296204 A1 | 11/2010 | Ichikawa et al. |
| 2011/0029168 A1 | 2/2011 | Talberg |
| 2011/0087392 A1 | 4/2011 | Kshatriya |
| 2011/0166731 A1 | 7/2011 | Kristinsson et al. |
| 2011/0246005 A1* | 10/2011 | King et al. .................. 701/22 |
| 2011/0264317 A1 | 10/2011 | Druenert et al. |
| 2012/0035795 A1 | 2/2012 | Yu et al. |

FOREIGN PATENT DOCUMENTS

| | | |
|---|---|---|
| CN | 101121406 | 2/2008 |
| CN | 201290031 | 8/2009 |
| CN | 201359033 | 12/2009 |
| DE | 44 12 438 C1 | 11/1995 |
| DE | 199 06 601 A1 | 9/1999 |
| DE | 199 50 080 A1 | 5/2000 |
| DE | 100 43 409 A1 | 4/2001 |
| DE | 101 03 188 A1 | 8/2002 |
| DE | 103 33 210 | 1/2005 |
| DE | 102004 60 078 A1 | 7/2006 |
| DE | 10 2005 041634 A1 | 12/2006 |
| DE | 10 2006 028333 A1 | 12/2006 |
| DE | 10 2006 060889 A1 | 12/2006 |
| DE | 10 2006 018624 A1 | 10/2007 |
| DE | 102007 01 841 A1 | 5/2008 |
| EP | 0 755 816 A2 | 1/1997 |
| EP | 913287 A2 | 5/1999 |
| EP | 0 926 030 A2 | 6/1999 |
| EP | 0 992 678 A1 | 4/2000 |
| EP | 1 101 644 A2 | 5/2001 |
| EP | 1 256 476 | 11/2002 |
| EP | 1 270 303 A1 | 1/2003 |
| EP | 1369279 A1 | 10/2003 |
| EP | 1 283 583 A2 | 8/2005 |
| EP | 1 577 139 A2 | 9/2005 |
| EP | 1 953 058 A1 | 8/2008 |
| EP | 1 975 028 A2 | 10/2008 |
| EP | 1 975 028 A3 | 4/2009 |
| EP | 2 090 486 A1 | 8/2009 |
| EP | 2 102 029 | 9/2009 |
| EP | 2168827 A1 | 3/2010 |
| FR | 2835661 | 8/2003 |
| FR | 2799697 A1 | 1/2004 |
| GB | 2 279 183 | 12/1994 |
| GB | 2 418 898 | 4/2006 |
| GB | 2 440 321 | 1/2008 |
| JP | 58-067940 | 4/1983 |
| JP | 59-119043 | 7/1984 |
| JP | 61-205374 | 9/1986 |
| JP | 7231506 | 8/1995 |
| JP | 7315078 | 12/1995 |
| JP | 8142886 A | 6/1996 |
| JP | 8310253 | 11/1996 |

(56) References Cited

FOREIGN PATENT DOCUMENTS

| | | |
|---|---|---|
| JP | 907601 | 4/1997 |
| JP | 10129298 | 5/1998 |
| JP | 11262105 | 9/1999 |
| JP | 2000030749 | 1/2000 |
| JP | 2001 047880 A | 2/2001 |
| JP | 2001069606 | 3/2001 |
| JP | 2001140670 | 5/2001 |
| JP | 2001 231103 A | 8/2001 |
| JP | 2001238305 | 8/2001 |
| JP | 2000333305 | 11/2001 |
| JP | 2002 262404 A | 9/2002 |
| JP | 2004248455 | 9/2004 |
| JP | 2004285866 | 10/2004 |
| JP | 2004353630 | 12/2004 |
| JP | 2005155582 | 6/2005 |
| JP | 2005192349 | 7/2005 |
| JP | 2006112311 | 4/2006 |
| JP | 2006233977 | 9/2006 |
| JP | 2007069625 | 3/2007 |
| JP | 2007181370 | 7/2007 |
| JP | 2008162318 | 7/2008 |
| JP | 2008164341 | 7/2008 |
| JP | 2008174019 | 7/2008 |
| JP | 2008273460 | 11/2008 |
| JP | 2009134497 | 6/2009 |
| JP | 2009143553 | 7/2009 |
| KR | 100267328 | 10/2000 |
| KR | 2003050447 | 3/2003 |
| KR | 2005118403 | 6/2007 |
| KR | 2007024827 | 9/2008 |
| KR | 2009065303 | 6/2009 |
| SU | 1410194 | 7/1988 |
| SU | 1674316 | 8/1991 |
| WO | WO 96/01193 A1 | 1/1996 |
| WO | WO 98/17494 | 4/1998 |
| WO | WO 00/15455 A2 | 3/2000 |
| WO | WO 2007/074745 A1 | 12/2005 |
| WO | WO 2006/020476 A2 | 2/2006 |
| WO | WO 2006/052719 A2 | 5/2006 |
| WO | WO 2007/023001 A1 | 3/2007 |
| WO | WO 2007/040629 A2 | 4/2007 |
| WO | WO 2008/038466 A1 | 4/2008 |
| WO | WO 2008/007120 A2 | 7/2008 |
| WO | WO 2008/113186 A1 | 9/2008 |
| WO | WO 2009/008477 A1 | 1/2009 |
| WO | WO 2009/065656 A1 | 5/2009 |
| WO | WO 2009/078835 A1 | 6/2009 |
| WO | WO 2009/121613 A1 | 10/2009 |
| WO | WO 2009/019580 A2 | 12/2009 |
| WO | WO 2009/149041 A1 | 12/2009 |

OTHER PUBLICATIONS

Isastia et al., "Overview on Automotive Energy Storage Systems", International Review of Electrical Engineering, vol. 4, Issue 6, Nov. 2009, pp. 1122-1145.
Kitt, Oliver, "Bypassing ECU functions using XCP stimulation mechanism", ECE, Jun. 2005, pp. 37-39.
Kowal et al., "Simulation of the current distribution in lead-acid batteries to investigate the dynamic charge acceptance in flooded SLI batteries", Journal of Power Sources, vol. 191, Issue 1, Jun. 1, 2009, pp. 42-50.
Moseley et al., "Lead-acid battery chemistry adapted for hybrid electric vehicle duty", Journal of Power Sources, vol. 174, Issue 1, Nov. 22, 2007, pp. 49-53.
Moseley, P.T, "Consequences of including carbon in the negative plates of Valve-regulated Lead-Acid batteries exposed to high-rate partial-state-of-charge operation", Journal of Power Sources, vol. 191, Issue 1, Jun. 1, 2009, pp. 134-138.
Soria et al., "New developments on valve-regulated lead-acid batteries for advanced automotive electrical systems", Journal of Power Sources, vol. 144, Issue 2, Jun. 15, 2005, pp. 473-485.
Sorrentino et al., "Control Oriented Modeling of Solid Oxide Fuel Cell Auxiliary Power Unit for Transportation Applications", Journal of Fuel Cell Science and Technology, vol. 6, Issue 4, Nov. 2009, 12 pages.
PCT International Search Report of International Application No. PCT/IN2010/000608; mailed Apr. 4, 2011; 4 pages.
PCT International Search Report of International Application No. PCT/IN2010/000609; mailed May 23, 2011; 7 pages.
PCT International Search Report of International Application No. PCT/IN2010/000614; mailed Apr. 6, 2011; 4 pages.
PCT International Search Report of International Application No. PCT/IN2010/000616; mailed Mar. 28, 2011; 4 pages.
PCT International Search Report of International Application No. PCT/IN2010/000619; mailed Apr. 11, 2011; 5 pages.
PCT International Search Report of International Application No. PCT/IN2009/000655; mailed Mar. 22, 2011; 5 pages.
PCT International Search Report of International Application No. PCT/IN2009/000656; mailed May 18, 2010; 5 pages.
Final Office Action dated Jun. 27, 2013 in U.S. Appl. No. 12/882,003.
Notice of Allowance dated Jun. 26, 2013 in U.S. Appl. No. 13/496,161.

* cited by examiner

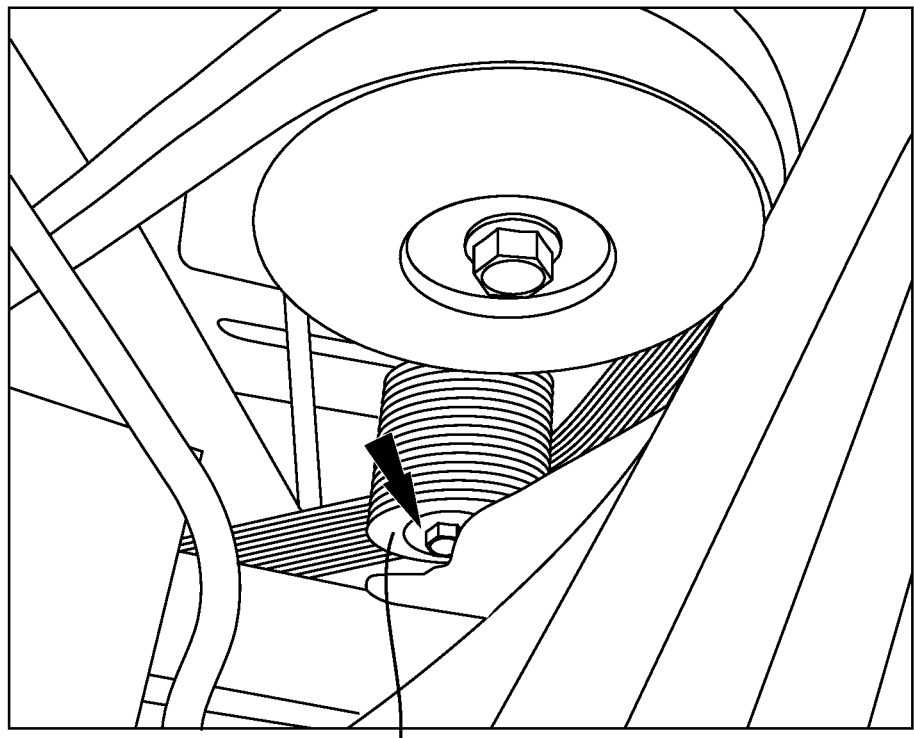
224 ⟵ FIG. 13A
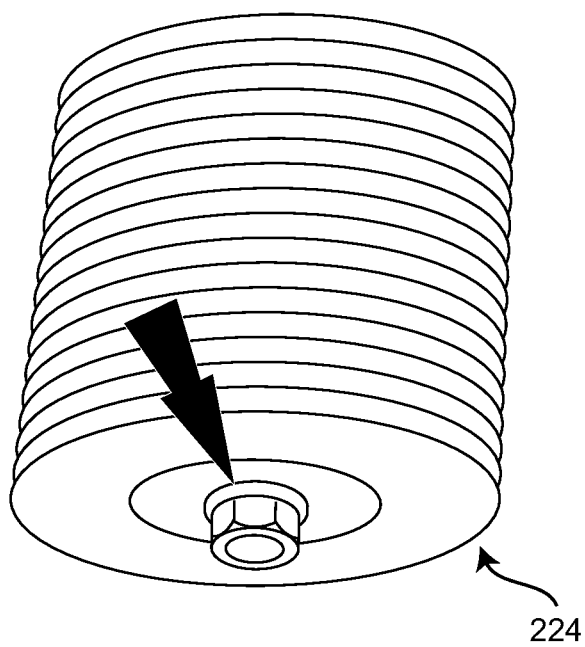
FIG. 13B
224

METHOD OF CONVERTING VEHICLE INTO HYBRID VEHICLE

CROSS-REFERENCE TO RELATED APPLICATIONS

The present application claims priority to and the benefit of the following patent applications, the disclosures of which are incorporated herein by reference in their entireties: Indian Patent Application No. 2108/MUM/2009, filed Sep. 15, 2009; Indian Patent Application No. 2109/MUM/2009, filed Sep. 15, 2009; International Application No. PCT/IN2009/000655, filed Nov. 15, 2009; International Patent Application No. PCT/IN2009/000656, filed Nov. 15, 2009; and Indian Patent Application No. 1386/MUM/2010, filed Apr. 30, 2010.

BACKGROUND

The present disclosure relates generally to the field of hybrid vehicles. More particularly, the present disclosure relates to a drive system that can be added to a vehicle to convert a new or existing vehicle into a hybrid vehicle. The present disclosure further relates to a method of modifying a new or existing vehicle into a hybrid vehicle either by an original equipment manufacturer or by a retro-fit application.

Hybrid vehicles offer consumers with an alternative to vehicles employing conventional internal combustion engines, transmissions, and drive trains which often exhibit relatively low fuel efficiency and/or produce undesirable emissions that are released during operation. A typical hybrid vehicle combines a battery powered electric motor with an internal combustion engine. Acceptability of hybrid vehicles by consumers depends at least partially on the cost of the solution and the benefit that the solution brings in terms of fuel efficiency as well as reduction in emissions. The fuel efficiency and emissions capabilities of a hybrid vehicle is at least partially dependent on the design and use of the primary components of the hybrid drive system (e.g., electric motor, battery, controller, associated software, etc.). There continues to be a need to provide a hybrid vehicle and/or a hybrid drive system for a vehicle that balances the independencies of the primary components of the hybrid vehicle in a manner that provides the consumer with an economical solution in terms of fuel efficiency as well as reduction in emissions. There also continues to be a need to provide a hybrid drive system for a vehicle that can be readily installed as a retro-fit application for existing vehicles and/or incorporated into a platform of a new vehicle by an original equipment manufacturer.

SUMMARY

One exemplary embodiment of the disclosure relates to a method of converting a vehicle having an internal combustion engine, a transmission, an alternator and a battery into a hybrid vehicle. The method comprises installing an electric motor within the vehicle that is configured to assist the internal combustion engine in rotating a crankshaft of the internal combustion engine, installing an energy storage element configured to provide power to the electric motor, installing a motor control unit configured to control the amount of power delivered from the energy storage element to the electric motor and replacing an existing pulley on the crankshaft of the internal combustion engine with a new pulley configured to receive a first belt extending between the new pulley and an auxiliary motor pulley and a second belt extending between the new pulley and an electric motor pulley.

Another exemplary embodiment of the disclosure relates to a method of converting a vehicle having an internal combustion engine and a transmission. The method comprises installing an electric motor within the vehicle that is configured to assist the internal combustion engine in rotating a crankshaft of the internal combustion engine, coupling an output shaft of the electric motor to an end of the crankshaft that is opposite the transmission via a universal coupling, installing an energy storage element configured to provide power to the electric motor and installing a motor control unit configured to control the amount of power delivered from the energy storage element to the electric motor.

BRIEF DESCRIPTION OF THE DRAWINGS

FIG. 13A is a perspective view of the new idler pulley of the hybrid drive system according to an exemplary embodiment.

FIG. 13B is a perspective view of just the idler pulley of FIG. 13A.

DETAILED DESCRIPTION

Referring generally to the figures, a hybrid drive system 100 and components thereof are shown according to exemplary embodiments. Hybrid drive system 100 is configured to be installed within a vehicle (e.g., automobiles such as cars, trucks, sport utility vehicles, minivans, buses, and the like; tri-pods, scooters, airplanes, boats, etc.), either by an original equipment manufacturer and/or as a retrofit application, and provide a system that can selectively reduce the driving load of an engine (e.g., by at least partially sharing the load, etc.) and/or increase the torque capacity of an engine by assisting in the rotation of a crankshaft of the engine. The addition of hybrid drive system 100 to a vehicle is intended to improve fuel economy (e.g., consumption, etc.), emission rates and/or vehicle power in comparison to the same vehicle operating without hybrid drive system 100. Hybrid drive system 100 may be installed at any suitable location within a vehicle and integrated with any other vehicle components, and may be provided in a wide variety of sizes, shapes, and configurations, and installed using a wide variety of manufacturing and assembly processes according to various exemplary embodiments. All such variations are intended to be within the scope of the present disclosures.

Figure 1A:
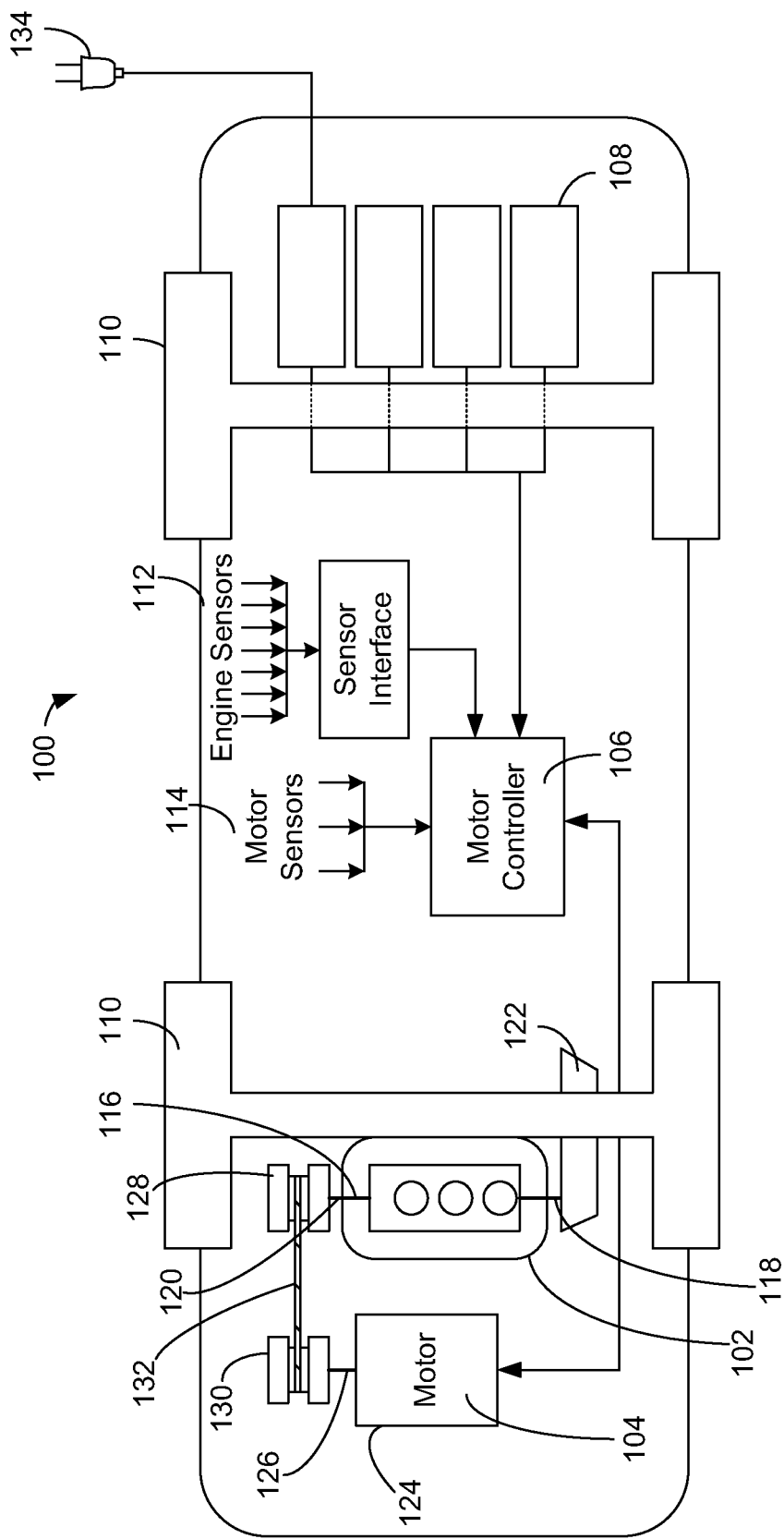
FIG. 1A is a schematic diagram of a vehicle and a hybrid drive system according to an exemplary embodiment.

FIG. 1A is a schematic illustration of a vehicle and a hybrid drive system 100 according to an exemplary embodiment. Hybrid drive system 100 generally includes an engine (e.g., diesel engine, turbine engine, etc.), shown as a gas-powered internal combustion engine 102, an electric motor 104, a motor control unit 106 and a source of electrical power, shown as a battery 108. Battery 108 is in the form of a battery pack including a number of energy storage devices in the form of electrochemical cells or batteries (although capacitive devices such as supercapacitors and/or ultracapacitors may be used in place of or in addition to the batteries according to other exemplary embodiments).

Internal combustion engine 102 functions as a prime mover of the vehicle by generating a torque output that is sufficient to drive one or more wheels 110 of the vehicle. Electric motor 104 is provided to assist internal combustion engine 102 by reducing the driving load of internal combustion engine 102 (e.g., by at least partially sharing the load, etc.) and/or by augmenting the power of internal combustion engine 102. Electric motor 104 is powered by battery 108 and controlled by motor control unit 106. Motor control unit 106 controls electric motor 104 based on output signals received from engine sensors 112, motor sensors 114 and/or battery sensors, as detailed below.

It should be noted at the outset that for purposes of this disclosure, the term hybrid, whether used alone or in combination with terms such as vehicle and/or drive system, is used generally to refer to a vehicle having a drive system that includes more than one power source. According to an exemplary embodiment, hybrid drive system 100 utilizes an internal combustion engine and an electric motor. According to other embodiments, the internal combustion engine and/or the electric drive motor and control systems thereof may be replaced by a variety of known or otherwise suitable power sources.

The amount of assistance provided to internal combustion engine 102 by electric motor 104, and the duration for which assistance is provided, is controlled, at least in part, by motor control unit 106. Motor control unit 106 includes a motor controller configured to generate and/or receive one or more control signals for operating electric motor 104. Motor control unit 106 may include one or more processors (e.g., microcontrollers) and one or more computer-readable media (e.g., memory) configured to store various data utilized by motor control unit 106 and/or instructions that may be executed by the processor(s) to perform various functions. A memory of motor control unit 106 may include one or more modules (e.g., software modules) including, but not limited to a motor control module and an energy management module.

The motor control module is configured to generate one or more control signals to control the operation of electric motor 104. According to an exemplary embodiment, the motor control module may generate control signals based on one or more motor assistance profiles based on experimental and/or modeling results. The energy management module is configured to manage energy provided by battery 108. According to an exemplary embodiment, the energy management module may be configured to determine the amount of available charge remaining in battery 108 plus the charge that would become available as a result of regenerative braking and may be configured to change the control signals provided to electric motor 104 based on the available charge in battery 108 and/or other vehicle operating conditions.

Motor control unit 106 receives one or more inputs from various sensors, circuits and/or other components of the vehicle such as internal combustion engine 102, electric motor 104, battery 108. The inputs may include digital inputs (e.g., brake, hand brake, clutch, reverse, air conditioning, ignition, mode selection, such as economy or power, etc.), modulated and/or encoded inputs (e.g., vehicle speed sensor, engine speed sensor, encoders, etc.), analog inputs (e.g., motor temperature, engine temperature, temperature of battery 108, throttle position, manifold pressure, brake position, etc.), and/or other types of inputs. According to an exemplary embodiment, one or more of the inputs may be isolated through isolator circuitry (e.g., galvanic isolators). Information received at the inputs may be received from various vehicle sensors (e.g., existing vehicle sensors, engine management system, sensors added to the vehicle for use by hybrid drive system 100, etc.).

Motor control unit 106 may also be configured to generate one or more system outputs such as a motor controller power output to toggle power to the motor controller, a fault lamp output to indicate a fault, display outputs to display various information about motor control unit 106 (e.g., to a driver of the vehicle, mechanic, etc.), and/or other types of outputs. Motor control unit 106 may also be configured to generate one or more outputs (e.g., digital outputs, analog outputs, etc.) such as injector outputs and/or system outputs. The injector outputs may be configured to control fuel injectors (e.g., through one or more controllers) to delay and/or limit the flow of fuel to the engine. The system outputs may include a power supply control output, motor controller cooling fan output, fault lamp output, pump output, and/or other types of outputs used to provide information to and/or control various components of the vehicle (e.g., including the engine, etc.). Motor control unit 106 may also be configured to generate display information for display to a driver of the vehicle (e.g., on a display on or near the dashboard of the vehicle).

In addition to assisting internal combustion engine 102 by reducing the driving load of internal combustion engine 102 and/or by augmenting the power of internal combustion engine 102, electric motor 104 may also be configured to function as a generator for charging battery 108 and/or for supplying electric energy to various electrical components within the vehicle. For example, electric motor 104 may function as a generator when no torque is required from internal combustion engine 102 (e.g., when the vehicle is idling, coasting, braking, etc.). Electric motor 104 may further be configured to supply mechanical energy (e.g., rotational mechanical energy, etc.) for operating one or more systems within the vehicle. For example, as detailed below, electric motor 104 may be used to power a compressor that is part of an air conditioning system of the vehicle.

According to an exemplary embodiment, battery 108 is a plurality of lead-acid batteries coupled together in series. According to other embodiments, battery 108 may be selected from a number of suitable batteries including, but not limited to, lithium-ion batteries, nickel-metal-hydride (NiMH) batteries, etc. According to further alternative embodiments, battery 108 may be replaced by or used in combination with any other type of energy storage element (e.g., one or more capacitors, super capacitors, etc.).

Battery 108 is configured to receive a charge from electric motor 104 when electric motor 104 is functioning as a generator. If battery 108 is not sufficiently charged during the operation of the vehicle, the vehicle will operate as a fuel only vehicle until battery 108 has been recharged. According to an exemplary embodiment, a separate charger is also provided for charging battery 108. Such a charger includes a connector, shown as a plug 134, that allows a user to plug-in hybrid drive system 100 when the vehicle is not in use. According to the embodiment illustrated, battery 108 and the separate charger are both shown as being stored within the trunk of the vehicle. According to other embodiments, battery 108 and/or the separate charger may be positioned in any other available spaces within the vehicle.

Still referring to FIG. 1A, internal combustion engine 102 includes an output shaft, shown as a crankshaft 116 having a first output 118 and a second output 120. First output 118 is configured to be coupled to a drive train of the vehicle for delivering power to one or more of wheels 110. According to the embodiment illustrated, the vehicle is a front wheel drive vehicle and the drive train includes a transmission 122 (either an automatic transmission or a manual transmission) coupled to the front wheels 110 via one or more axles, differentials, linkages, etc. According to other embodiments, hybrid drive system 100 may also be used on a rear-wheel drive vehicle and/or an all-wheel drive vehicle. Internal combustion engine 102 delivers rotational mechanical energy to the drive wheels through transmission 122 by rotating crankshaft 116.

Electric motor 104 is coupled in parallel with internal combustion engine 102 to assist internal combustion engine 102 in supplying the rotational mechanical energy to transmission 122. According to the embodiment illustrated, electric motor 104 is coupled to second output 120 of crankshaft 116; second output 120 being provided at an end of crankshaft 116 that is opposite first output 118 such that electric motor 104 is coupled to an end of crankshaft 116 that is opposite the end which is coupled to transmission 122 (e.g., on opposite sides of internal combustion engine 102, etc.). Coupling electric motor 104 at such a position relative to internal combustion engine 102, rather than on the same side as transmission 122, may simplify the addition of hybrid drive system 100, particularly in retro-fit applications. Further, positioning electric motor 104 before (e.g., forward, etc.) of transmission 122 allows electric motor 104 to take advantage of the gearing of transmission 122 to reduce the load on electric motor 104. For example, for one exemplary embodiment of a vehicle having a 5-speed manual transmission, the gear ratios may vary between approximately 3.45 and approximately 0.8 as the gear position is changed from first gear to fifth gear. Thus, for the given example, coupling electric motor 104 to crankshaft 116 before transmission 122 would advantageously allow electric motor 104 to provide an output torque in first gear that is 3.45 times greater than if the same electric motor 104 was coupled to crankshaft 116 after transmission 122. As such, the system allows a smaller electric motor 104 to be used to meet the torque demand of a particular application.

Electric motor 104 assists internal combustion engine 102 by assisting in the rotation of crankshaft 116 to reduce the driving load of internal combustion engine 102 (e.g., by at least partially sharing the load, etc.) and/or augmenting the power of internal combustion engine 102. Because the driving load of internal combustion engine 102 can be reduced, the fuel economy (e.g., consumption, etc.) and/or the emission rates can be improved. The amount of assistance provided by electric motor 104, and/or the time period at which assistance is provided by electric motor 104, may vary depending on the particular needs and/or parameters of the application in which hybrid drive system 100 is being used. According to an exemplary embodiment, an objective of the assistance provided by electric motor 104 is to move internal combustion engine 102 to an efficient operating zone thereby reducing the emissions.

Electric motor 104 generally includes a motor housing 124 and an output shaft 126. According to an exemplary embodiment, electric motor 104 is a three-phase alternating current induction motor. According to other embodiments, electric motor 104 may be any of a number of suitable motors including, but not limited to, a direct current motor, a direct current motor having a programmable logic controller, etc.

According to an exemplary embodiment, electric motor 104 is positioned relative to internal combustion engine 102 such that housing 124 is adjacent to a side of internal combustion engine 102 (e.g., a front side, etc.), with output shaft 126 being substantially parallel to and offset from crankshaft 116. According to the embodiment shown, electric motor 104 is positioned forward of internal combustion engine 102 (relative to a driving direction of the vehicle) and is coupled to internal combustion engine 102 via a pulley system. The pulley system generally includes a first pulley 128 and a second pulley 130. First pulley 128 is rotatably coupled to second output 120 of crankshaft 116, while second pulley 130 is rotatably coupled to output shaft 124 of electric motor 104. A coupling device (e.g., chain, strap, etc.), shown as a belt 132, is provided between first pulley 128 and second pulley 130. According to other embodiments, electric motor 104 may be positioned in any of a number of locations relative to internal combustion engine 102 (e.g., above, below, at one or more lateral sides, behind, etc.).

Figure 1B:
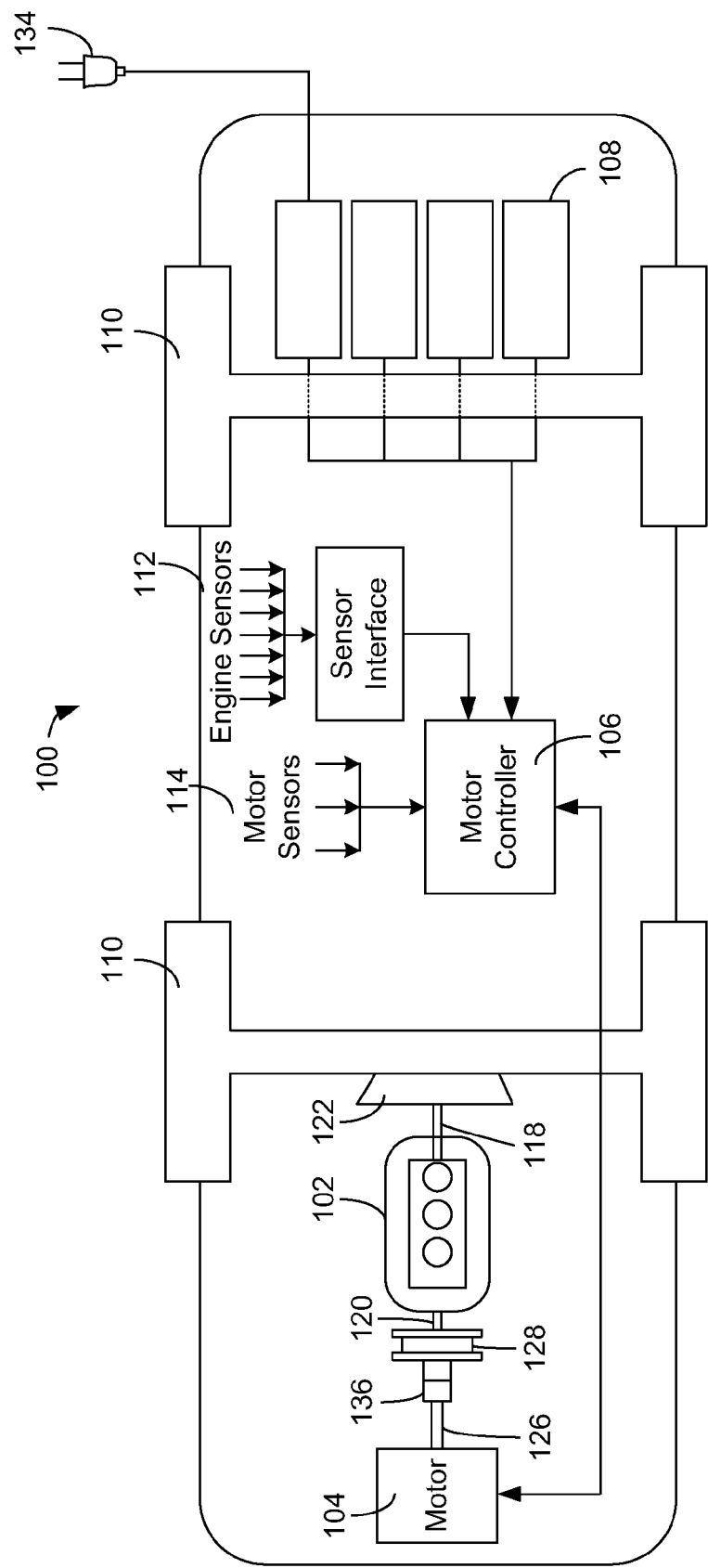
FIG. 1B is a schematic diagram of a vehicle and a hybrid drive system according to another exemplary embodiment.
Figure 2:
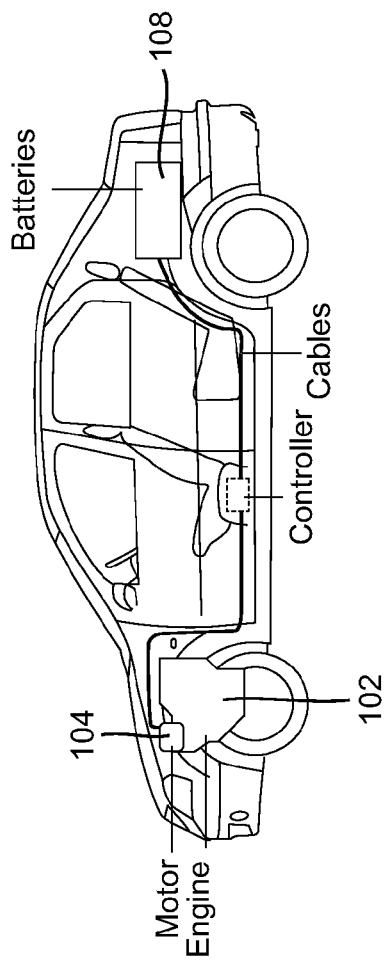
FIG. 2 is a side view of a vehicle having the hybrid drive system of FIG. 1 according to an exemplary embodiment.
Figure 3:
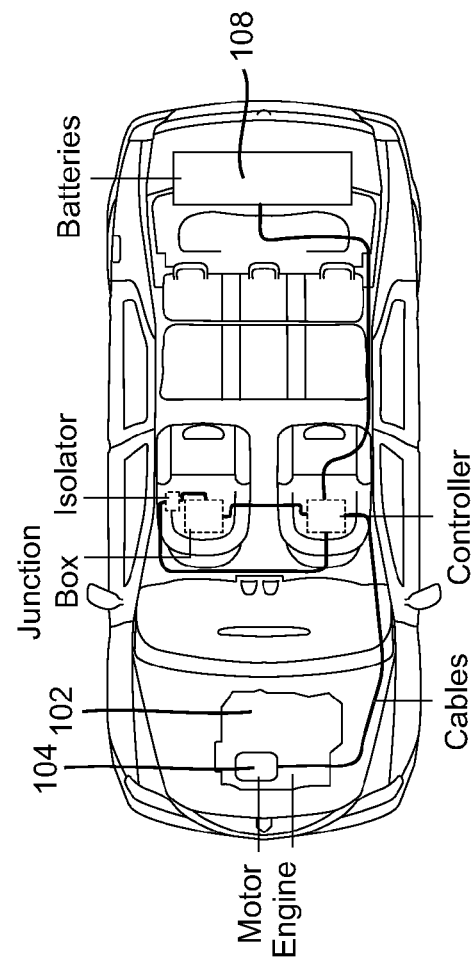
FIG. 3 is a top view of the vehicle of FIG. 2.

According to other embodiments, the pulley system may be replaced with any other suitable coupling system including, but not limited to, a system of gears. Referring to FIG. 1B, hybrid driver system 100 is shown according to another exemplary embodiment. According to the embodiment illustrated, electric motor 104 is positioned relative to internal combustion engine 102 such that an end of housing 124 is facing an end of internal combustion engine 102 and output shaft 126 is at least partially aligned (e.g., coaxial, concentric, etc.) with second output 120 of crankshaft 116. A shaft coupling (e.g., universal joint, collar, etc.), shown as a universal coupling 136, is provided between output shaft 126 and second output 120 to directly couple electric motor 104 to internal combustion engine 102. Universal coupling 136 is configured to compensate for any slight misalignment between output shaft 126 and second output 120. According to the embodiment illustrated, universal coupling 136 is mounted to first pulley 128, which is rotatably supported by internal combustion engine 102. Similar to the embodiment detailed above with regard to FIG. 1A, first pulley 128 may support a belt coupled to at least one of an alternator and a compressor of an air conditioning system.

The size (i.e., power requirement) of electric motor 104 is relatively small compared to a typical hybrid vehicle having an electric motor coupled in parallel with an internal combustion engine. A smaller motor may be less expensive than a larger motor and may allow the hybrid system to be implemented at a lower cost. A smaller motor may also consume a smaller volume of space. Because space within a vehicle (e.g., under the hood, etc.) may be limited, use of a smaller motor may allow hybrid drive system 100 to be integrated more easily into vehicles. A smaller motor also may weigh less than a larger motor, but may be adequate to provide the required torque for a short time (e.g., when engine emissions are high, etc.). Use of a smaller motor may in turn provide greater fuel economy and lower emissions as compared to a system that utilizes a larger motor. A smaller motor may also allow electrical power to be provided at a lower voltage and/or current, which may allow for smaller conductors to be used to provide power between components of the hybrid system and/or may increase the safety of the system.

There are at least two reasons why the size of electric motor 104 can be reduced in hybrid drive system 100. First, hybrid drive system 100 never operates the vehicle as a pure electric vehicle. In other words, electric motor 104 never drives the vehicle by itself, but rather only functions as a power assist device for internal combustion engine 102, in addition to possibly operating as a generator and/or as a drive device for one or more vehicle components. By providing assistance to internal combustion engine 102, electric motor 104 allows internal combustion engine 102 to operate in a more efficient zone while still providing the required driving torque of the vehicle. As such, electric motor 104 does not have to be able to meet the same torque and/or speed demands of internal combustion engine 102. Second, assistance is provided only at selective periods and at selective amounts. As such, electric motor 104 does not have to operate on a continuous basis, at least not in a torque control mode of operation.

For example, greater assistance may be provided at operating conditions where the benefit of the assistance (e.g., on reduced emissions, increased fuel economy, increased power, etc.) is higher, and less assistance may be provided at operating conditions where the benefit of the assistance is lower. According to an exemplary embodiment, hybrid drive system 100 provides more assistance when the speed of internal combustion engine 102 is relatively low (e.g., less than 2000 rpm) and less assistance when the speed of internal combustion engine 102 is relatively high (e.g., greater than 4500 rpm). In other words, when the vehicle is operating at a relatively high speed, hybrid drive system 100 allows internal combustion engine 102 to supply the higher torque requirements and electric motor 104 is not providing any assistance to internal combustion engine 102. When there is a sudden demand for higher torque at lower speeds, electric motor 104 gives maximum assistance to internal combustion engine 102. It has been recognized that when internal combustion engine 102 is at lower speeds, it takes a while for internal combustion engine 102 to meet the higher torque level due to inertia and the system lag. During this period, electric motor 104 is capable of being run at its peak capacity thereby quickly meeting the torque demand of the vehicle. However, such instances of peak demand are in general far and few between. With this strategy, internal combustion engine 102 is pushed in the desired zone operation.

An example of a situation when the speed of internal combustion engine 102 is relatively high is during acceleration. As such, hybrid drive system 100 is configured to provide assistance during acceleration of the vehicle. Hybrid drive system 100 may determine (e.g., by receiving signals from one or more sensors) that there is a demand for the vehicle to accelerate (e.g., when the accelerator or gas pedal is depressed). In response, electric motor 104 is controlled to provide assistance to internal combustion engine 102 during this period. According to an exemplary embodiment, assistance is only provided for a short time or pulse. However, the amount of assistance provided during this short pulse may be greater than a continuous rating of electric motor 104. For example, electric motor 104 may be operated at or near its peak rating during this period. By operating the motor for a short time at a current above its continuous rating, the power demands of the vehicle may be met and the efficiency (e.g., emissions, fuel economy, etc.) may be improved while using a smaller electric motor.

Determining the amount of assistance that electric motor 104 should be able to provide internal combustion engine 102 is a balance of a number of factors. One strategy for selecting electric motor 104 is to select an electric motor that can provide the minimum power (e.g., torque) requirement needed to assist internal combustion engine 102 for the amount and duration desired. Such a strategy allows the size of electric motor 104, the size of battery 108 and the overall weight of hybrid system 100 to be reduced. According to an exemplary embodiment, this strategy includes selecting an electric motor 104 that has a peak rating that is between approximately 40 percent and approximately 50 percent of the power output (e.g., horsepower) of internal combustion engine 102.

The following is an example of such a motor selection strategy. In such an example, the vehicle has an internal combustion engine 102 that is rated at approximately 47 horsepower. Per the strategy set forth above, electric motor 104 should be sized to provide approximately 40 percent of the horsepower of internal combustion engine 102. To design for a maximum load situation, it is assumed that when the vehicle is in a higher gear, the gear ratio is approximately 1:1. Thus, the most power that electric motor 104 should need is approximately 18.8 horsepower (i.e., 0.4*47) or approximately 14 kilowatt. Rather than select an electric motor 104 with a continuous rating that is closest to this value, the strategy of hybrid drive system 100 is to select an electric motor 104 with a peak rating that is closest to this value. In general, a peak rating of a motor is approximately four to five times that of the continuous rating. It has been found that for short durations, electric motor 104 can operate at four to five times higher than its continuous rating without overheating and/or without damaging electric motor 104. Therefore, under such a strategy, electric motor 104 should have a continuous rating of approximately 3.5 kilowatt.

In a second example, the vehicle is a midsize vehicle having an internal combustion engine 102 that is rated between approximately 75 and 80 horsepower. Using the same strategy as outlined above, an electric motor 104 having a continuous rating of approximately 6 kilowatt would be selected for hybrid drive system 100.

Another strategy that may be used in selecting electric motor 104 is to select an electric motor 104 with a continuous rating that is less than one tenth (1/10) of the maximum horsepower of internal combustion engine 102. According to an exemplary embodiment, the strategy may be to select an electric motor 104 with a continuous rating that is between approximately one tenth (1/10) and approximately one fortieth (1/40) of the maximum horsepower of internal combustion engine 102. According to another exemplary embodiment, the strategy may be to select an electric motor 104 with a continuous rating that is between approximately one fifteenth (1/15) and approximately one fortieth (1/40) of the maximum horsepower of internal combustion engine 102. According to another exemplary embodiment, the strategy may be to select an electric motor 104 with a continuous rating that is approximately one twentieth (1/20) of the maximum horsepower of internal combustion engine 102. According to other embodiments, different strategies may be used in selecting electric motor 104 (e.g., strategies that call for up to 100 percent idle torque as a percentage of maximum torque—i.e., 80 percent, etc.).

Once electric motor 104 is installed in hybrid drive system 100, the temperature of electric motor 104 will be monitored by motor control unit 106 to ensure that electric motor 104 does not overheat. The likelihood of overheating is reduced because motor control unit 106 is programmed to run electric motor 104 at the peak rating only in the form of pulses of a duration that is likely to be less than approximately four seconds. One or more sensors may be provided to detect if electric motor 104 is overheating and/or about to overheat, and if so, may be configured to cut off power to electric motor 104.

Selecting an electric motor 104 under such a strategy results in a power requirement for electric motor 104 that is relatively low. Because electric motor 104 has a relatively low power requirement, the size of battery 108 may be reduced. Further, the lower power requirement may also allow for a more cost effective type of battery to be used such as a lead-acid battery. For example, for the case in which a 3.5 kilowatt continuous power electric motor was selected for hybrid drive system 100, a 48-volt lead-acid type battery 108 may be used to power electric motor 104 and motor control unit 106. According to an exemplary embodiment, hybrid drive system 100 may use four 12-volt 100 ampere lead-acid type batteries coupled in series to provide the 48-volt battery 108.

With the selection of electric motor 104 and battery 108 completed, hybrid drive system 100 is ready to be added to the vehicle. As noted above, hybrid drive system 100 may be added to a vehicle by an original equipment manufacturer or as a retro-fit application to provide a consumer with an ability to convert an existing gas-powered vehicle into a hybrid vehicle. As a retro-fit application, hybrid drive system 100 can be offered as a relatively seamless conversion kit because the existing internal combustion engine 102 and transmission 104 do not need to be modified to accept hybrid drive system 100. While the specific steps required to add hybrid drive system 100 to a vehicle will vary depending on the make and model of the vehicle to which hybrid drive system 100 is to be added, steps that are likely to be required regardless of the vehicle include: i) locating a space within the vehicle to accept electric motor 104; ii) relocating, reconfiguring and/or removing certain vehicle components to provide sufficient clearance for electric motor 104; iii) mounting electric motor within vehicle; iv) coupling electric motor 104 to crankshaft 116 of internal combustion engine 102; v) installing motor control unit 106; vi) installing one or more energy storage elements (e.g., battery 108, etc.) for powering electric motor 104 and motor control unit 106.

Figure 21:
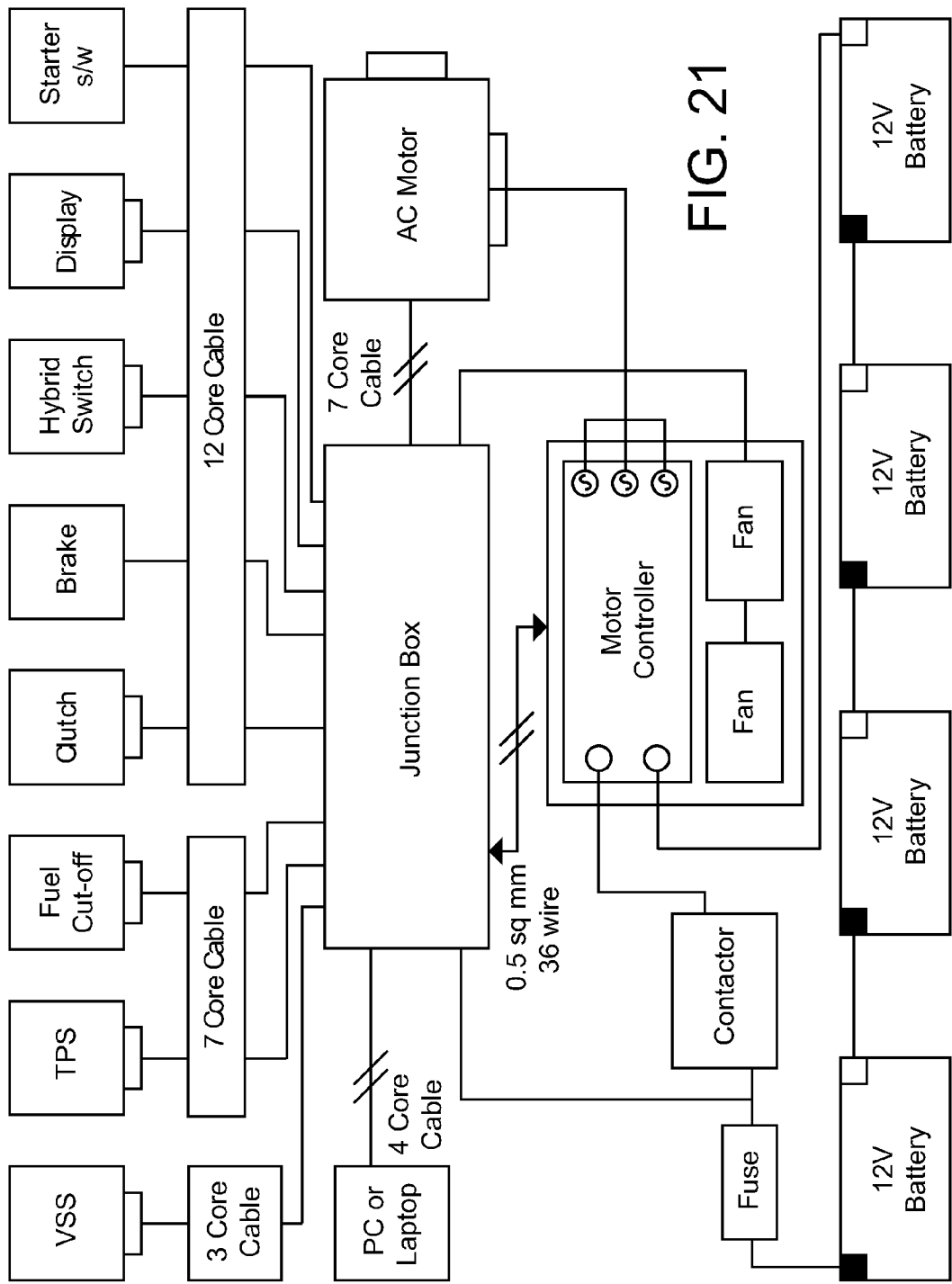
FIG. 21 is a schematic diagram of an electrical routing of the hybrid drive system according to an exemplary embodiment.
Figure 22:
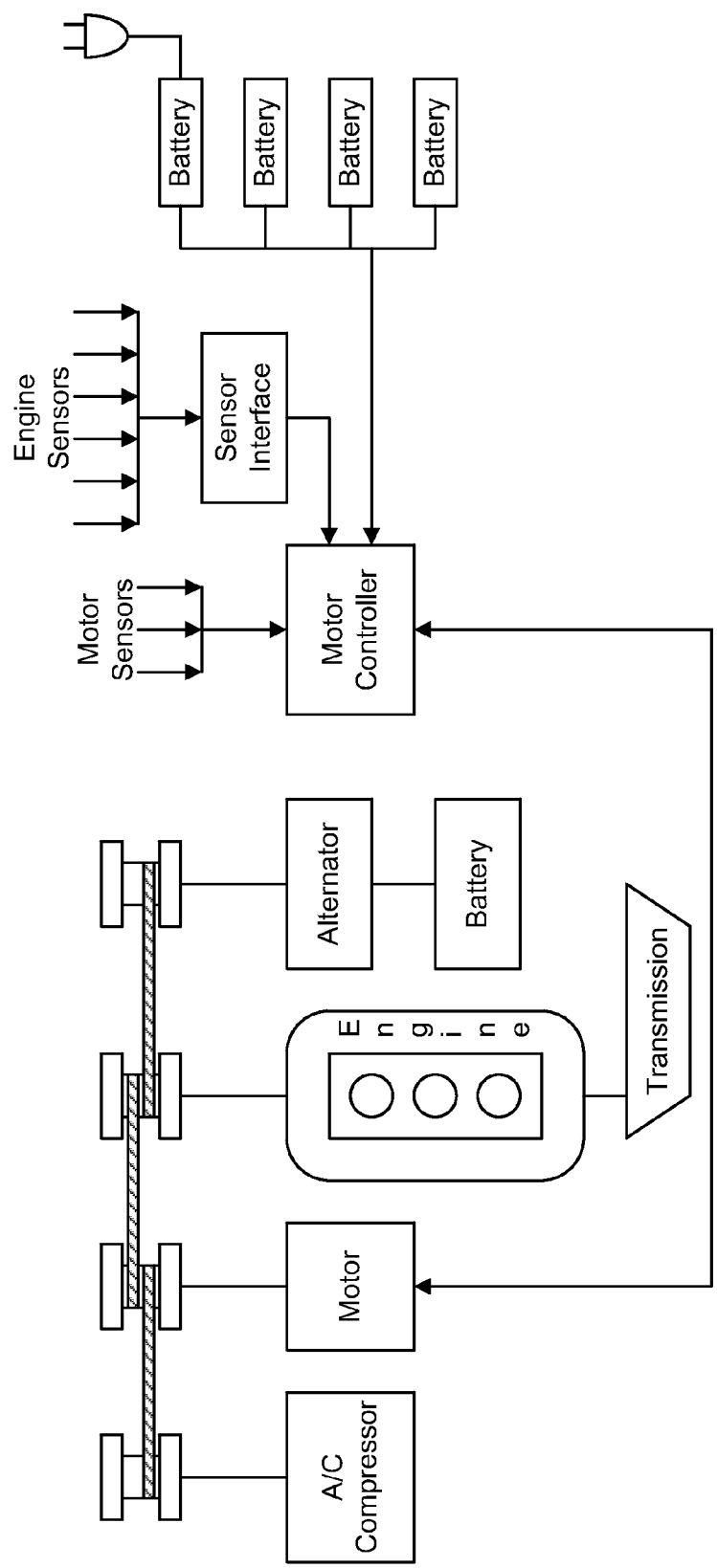
FIG. 22 is a schematic diagram of a vehicle hybrid drive system according to another exemplary embodiment.

Referring to FIGS. 1A through 22, a specific retro-fit application is shown according to an exemplary embodiment. One example vehicle hybrid drive system that incorporates various features described below is shown in FIG. 22 according to an exemplary embodiment. According to the various embodiments illustrated, the vehicle being converted into a hybrid vehicle is a midsize, four-door passenger vehicle having a 1.4 liter engine and a manual transmission. Using the strategy set forth above, an electric motor 104 having a continuous power rating of approximately 7.5 horsepower or 5.5 kilowatts has been selected to assist internal combustion engine 102. Before the conversion process begins, the vehicle includes, among other components, a battery, a starter motor for cranking internal combustion engine 102, an alternator for charging the battery and powering an electric system of the vehicle, and an air conditioning system having a compressor. Transmission 122 is coupled to one side of the crankshaft of internal combustion engine 102, while a pulley 200 (shown in FIGS. 5A and 5B) is coupled to a second side of the crankshaft, which is on a side opposite transmission 122. Pulley 200 is configured to receive a first belt that is coupled to a corresponding pulley on the alternator and a second belt that is coupled to a corresponding pulley on the air conditioner compressor.

Figure 4A:
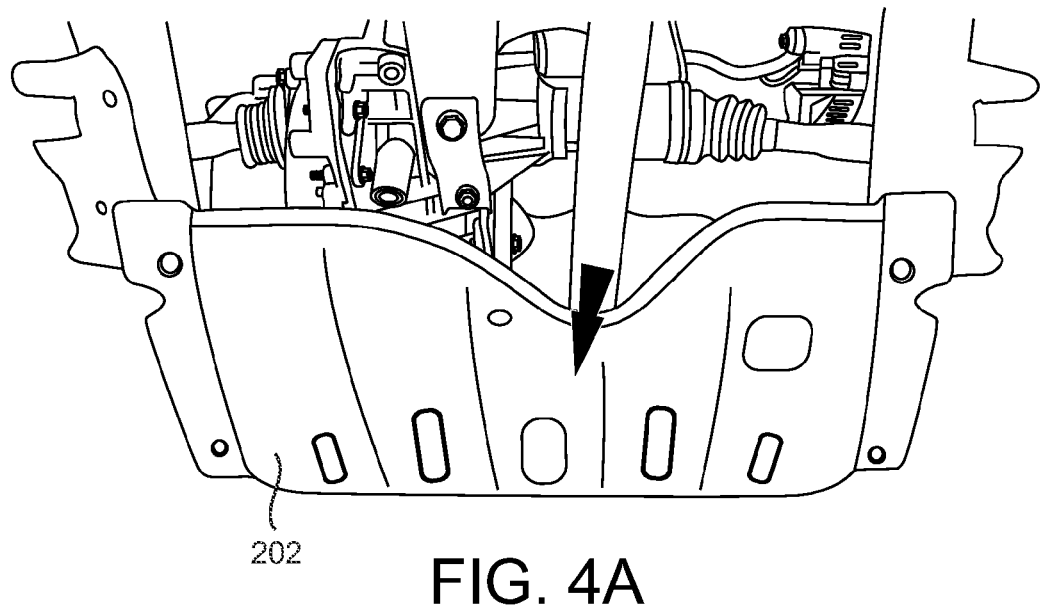
FIG. 4A is a bottom view of the vehicle of FIG. 2.
Figure 4B:
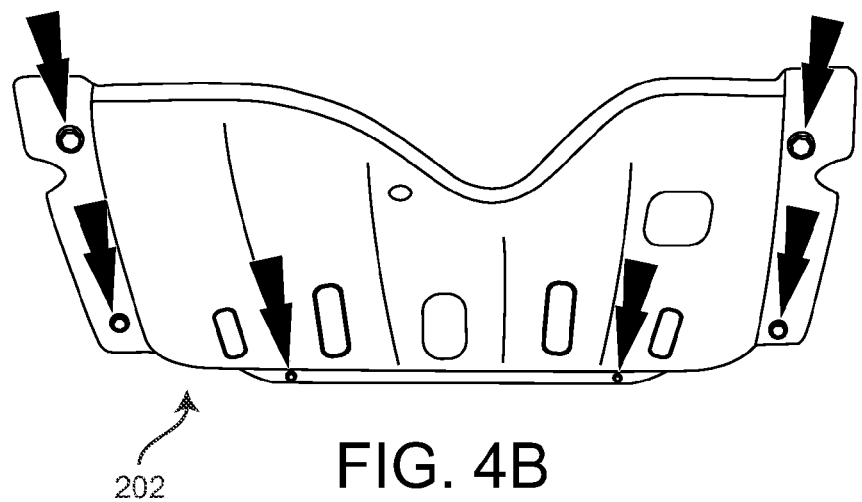
FIG. 4B is an engine cover of the vehicle of FIG. 2 according to an exemplary embodiment.
Figure 5A:
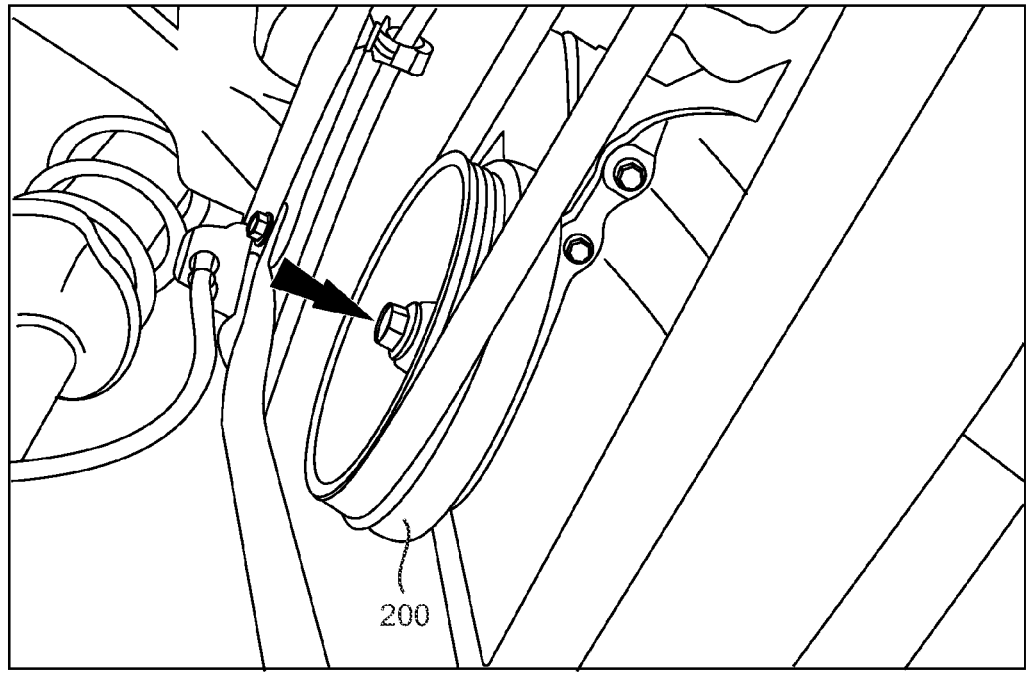
FIG. 5A is a perspective view of an existing pulley provided on a crankshaft of the vehicle of FIG. 2.
Figure 5B:
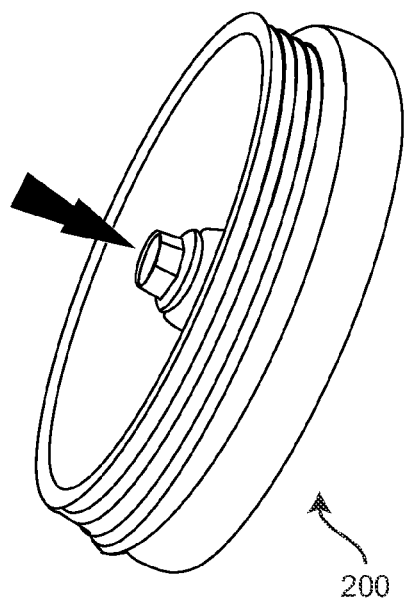
FIG. 5B is a perspective view of just the pulley of FIG. 5A.
Figure 6A:
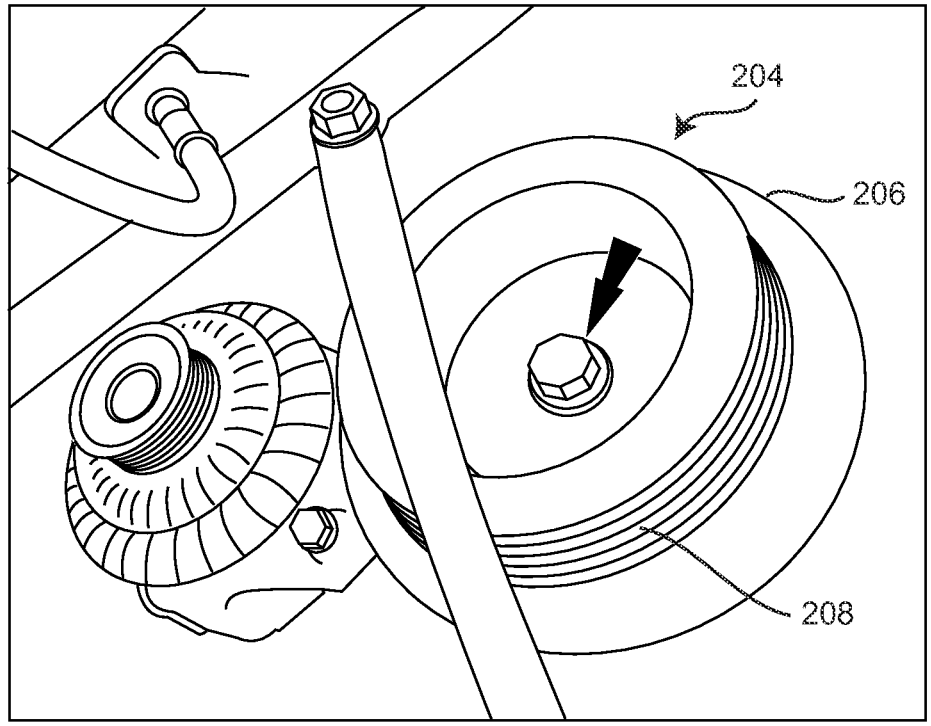
FIG. 6A is a perspective view of a pulley of the hybrid drive system that replaces the existing pulley provided on the crankshaft.
Figure 6B:
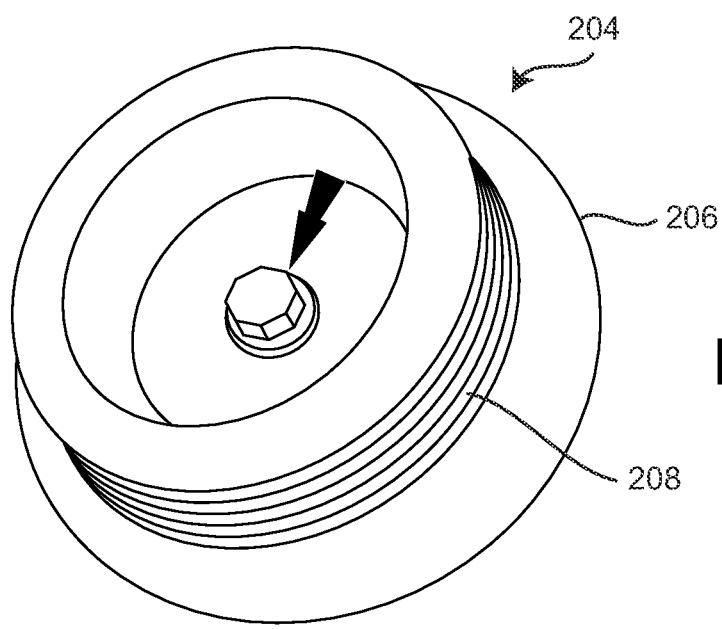
FIG. 6B is a perspective view of just the pulley of FIG. 6A.

Referring to FIGS. 4A and 4B, a preliminary step in the modification process is to at least partially disassemble certain components of the vehicle. This step may include removing one or more of the front wheels of the vehicle, the front bumper of the vehicle and any protective shields, shown as an engine cover 202, that may limit access to areas around internal combustion engine 102. The method of modifying the vehicle also includes removing pulley 200 (shown in FIGS. 5A and 5B) from the crankshaft and replacing it with a hybrid drive system pulley 204 (shown in FIGS. 6A and 6B). This step involves sufficiently locking the flywheel of internal combustion engine 102 to prevent the crankshaft from rotating as pulley 200 is being removed and replaced with hybrid drive system pulley 204.

According to an exemplary embodiment, hybrid drive system pulley 204 is a one-piece unitary body that includes a first pulley section 206 and a second pulley section 208. First pulley section 206 is substantially similar to the portion of pulley 200 that was configured to receive the belt coupled to the alternator. Second pulley section 208 is configured to receive a belt that will be coupled to electric motor 104 rather than the air conditioner compressor. To drive the air conditioner compressor, a new belt will be provided between electric motor 104 and the air conditioner compressor. As such, electric motor 104 will be used to drive the air conditioner compressor rather than internal combustion engine 102. Such an arrangement may advantageously allow the air conditioner to be operated even if internal combustion engine 102 is turned off, assuming a suitable clutch is provided between electric motor 104 and internal combustion engine 102 for selectively decoupling electric motor 104 from the crankshaft.

Figure 7:
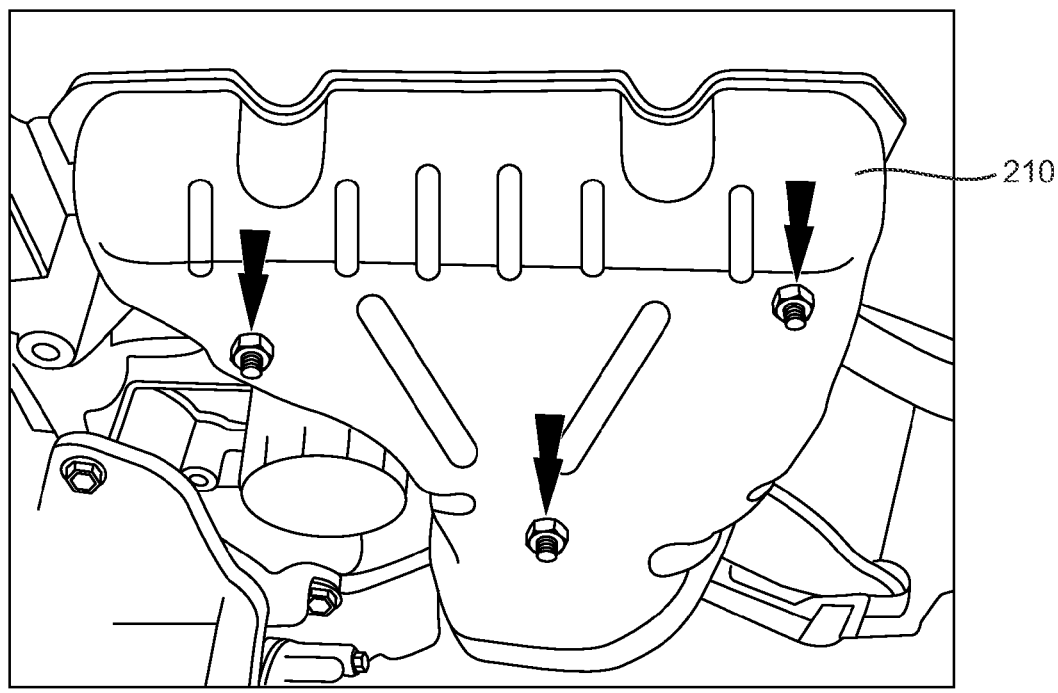
FIG. 7 is a perspective view of a manifold of the vehicle of FIG. 2.
Figure 8:
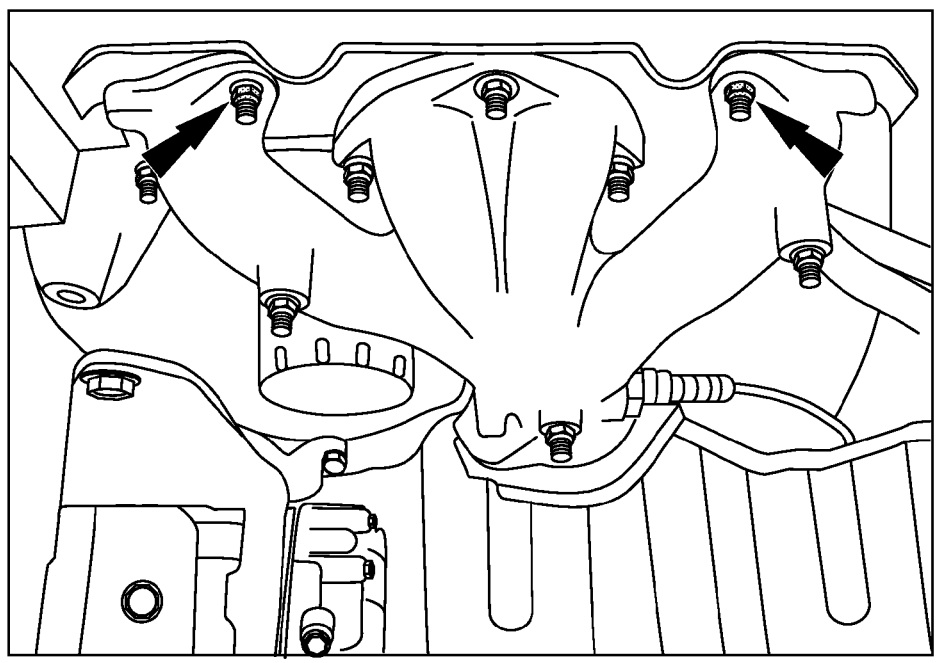
FIG. 8 is another perspective view of the manifold of the vehicle of FIG. 2, but with an exhaust heat shield removed.
Figure 9A:
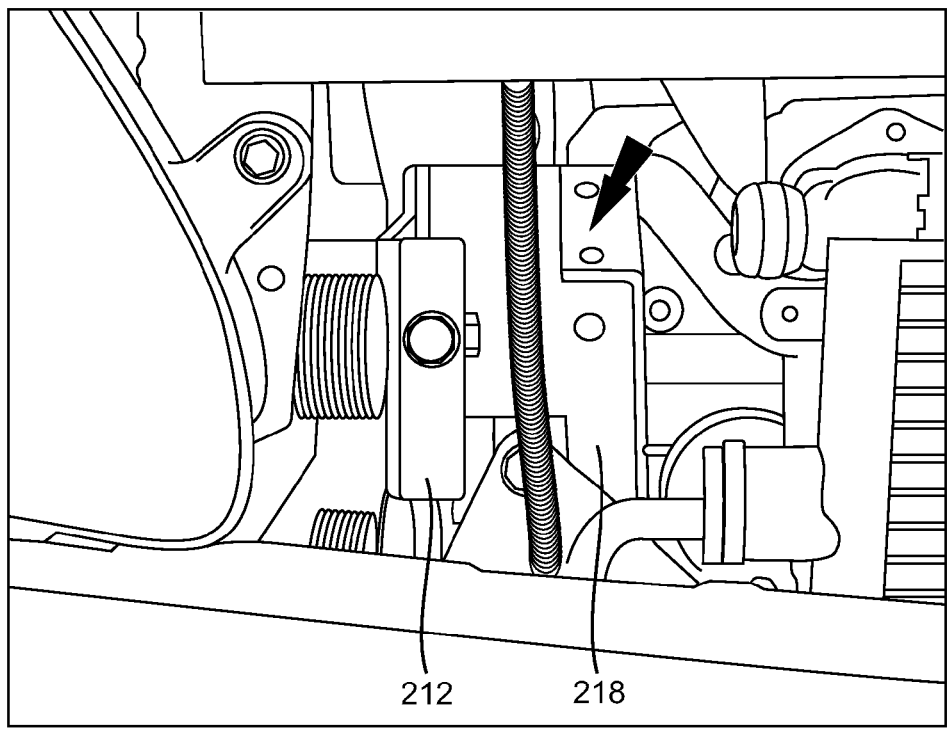
FIG. 9A is a perspective view of a first mounting device that is added to the vehicle to support the components of the hybrid drive system.
Figure 9B:
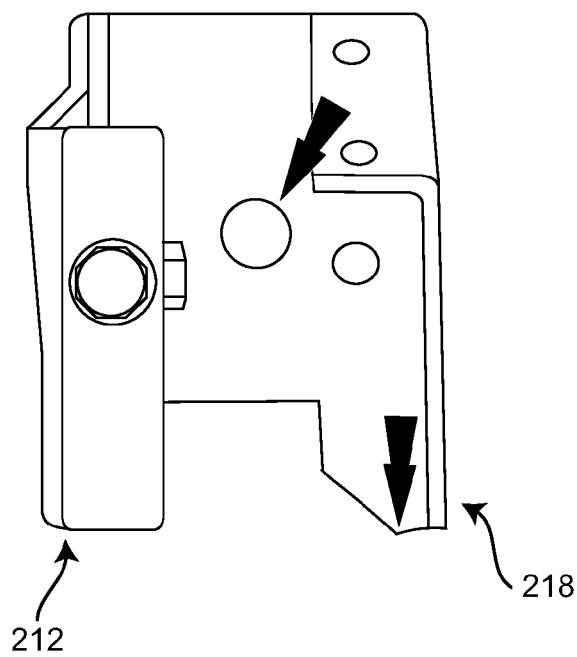
FIG. 9B is a perspective view of just the first mounting device.
Figure 10A:
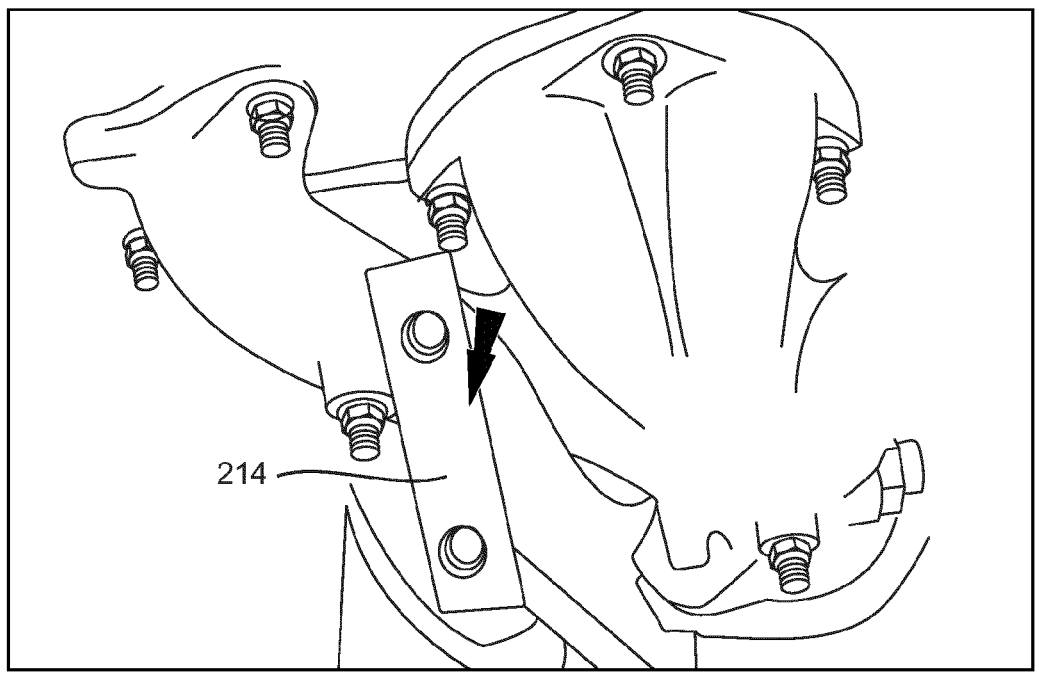
FIG. 10A is a perspective view of a second mounting device that is added to the vehicle to support the components of the hybrid drive system.
Figure 10B:
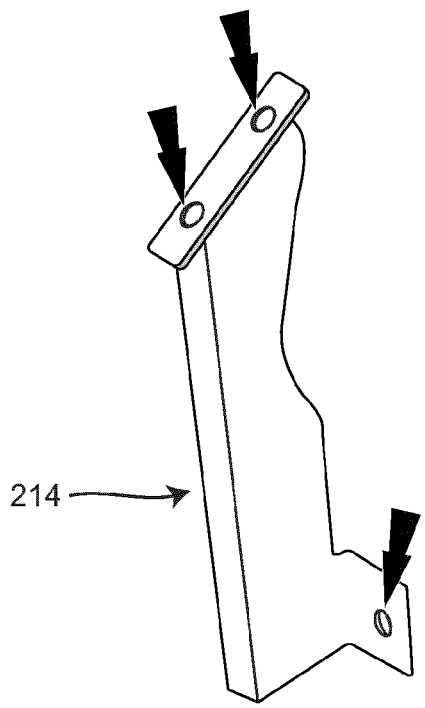
FIG. 10B is a perspective view of just the second mounting device.
Figure 11A:
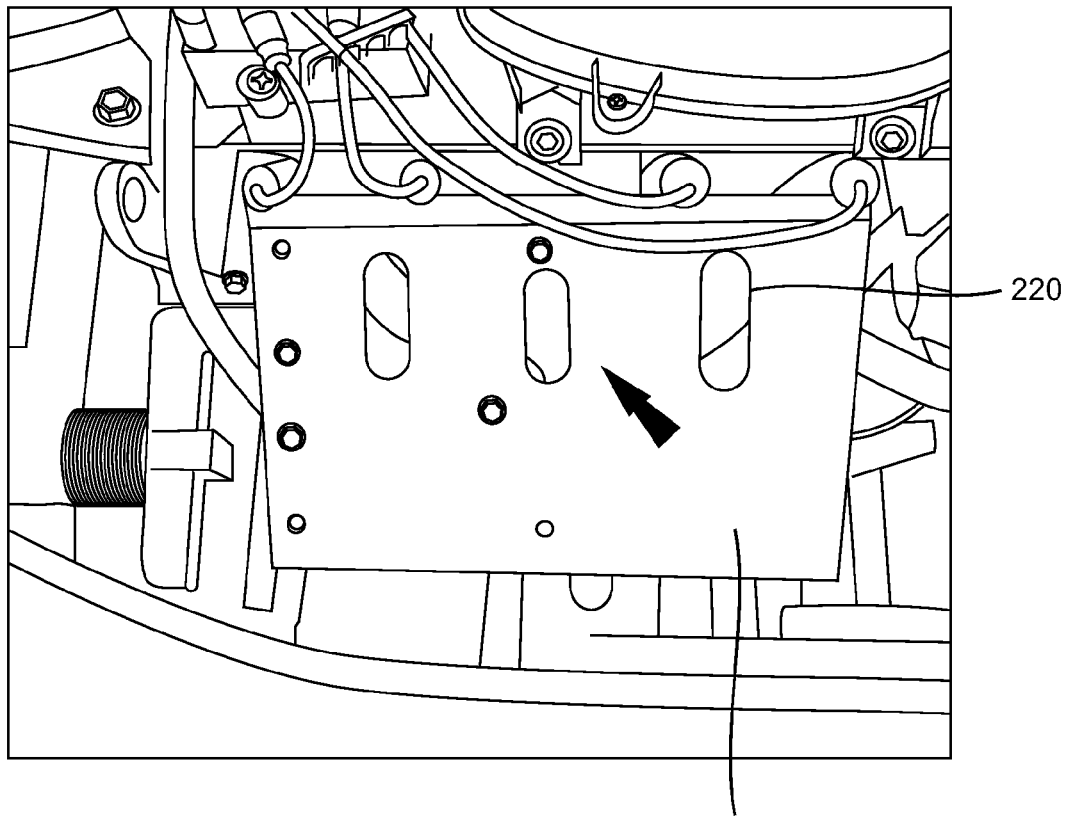
FIG. 11A is a perspective view of a third mounting device that is added to the vehicle to support the components of the hybrid drive system.
Figure 11B:
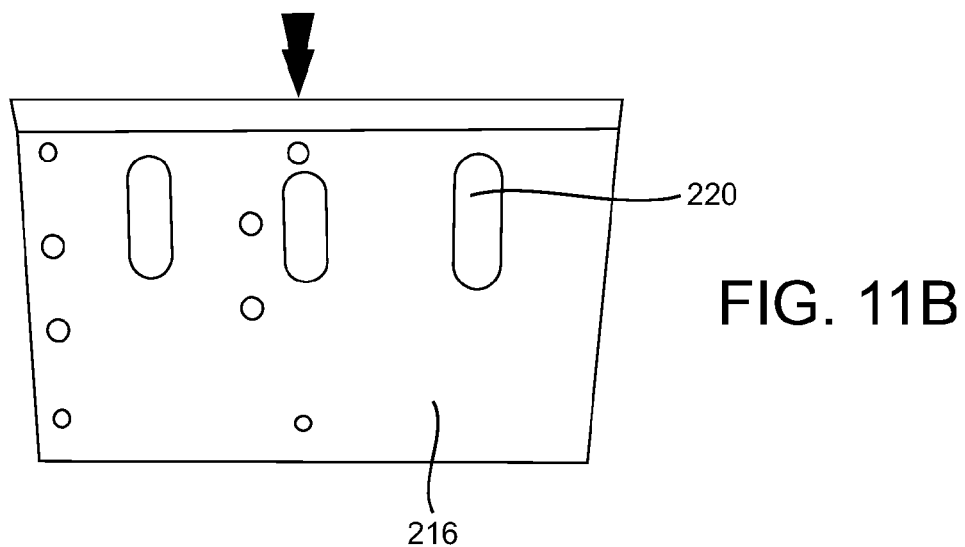
FIG. 11B is a perspective view of just the third mounting device.

According to an exemplary embodiment, electric motor 104 is configured to be mounted in front of internal combustion engine 102 in an area that is closely adjacent to an exhaust manifold of internal combustion engine 102. Referring to FIGS. 7 and 8, an exhaust manifold heat shield 210 is removed to provide additional clearance for electric motor 104 in this area. With exhaust manifold heat shield 210 removed, one or more mounting brackets may be added to support the components of hybrid drive system 100. Referring to FIGS. 9A through 11B, the method of modifying includes the steps of: i) installing an idler pulley bracket 212 onto the engine block (shown in FIGS. 9A and 9B); ii) installing a substantially vertical bracket 214 near the engine manifold (shown in FIGS. 10A and 10*b*); iii) installing a motor mounting bracket 216 onto the engine manifold and securing it to vertical bracket 214 (shown in FIGS. 11A and 11B); and iv) installing an air conditioner compressor bracket 218 onto the engine block (shown in FIGS. 9A and 9B).

According to an exemplary embodiment, motor mounting bracket 216 is configured as a substantially L-shaped member formed of a metal material. Motor mounting bracket 216 includes one or more openings 220 configured to promote air circulation around the engine manifold and electric motor 104 in an effort to reduce the likelihood that electric motor 104 will overheat. The entire weight of electric motor 104 is supported on motor mounting bracket 216, which is in turn supported entirely by internal combustion engine 102. According to other embodiments, electric motor 104 may be at least partially supported by the vehicle body and/or frame if there is not enough room to sufficient support electric motor 104 on internal combustion engine 102.

Figure 12:
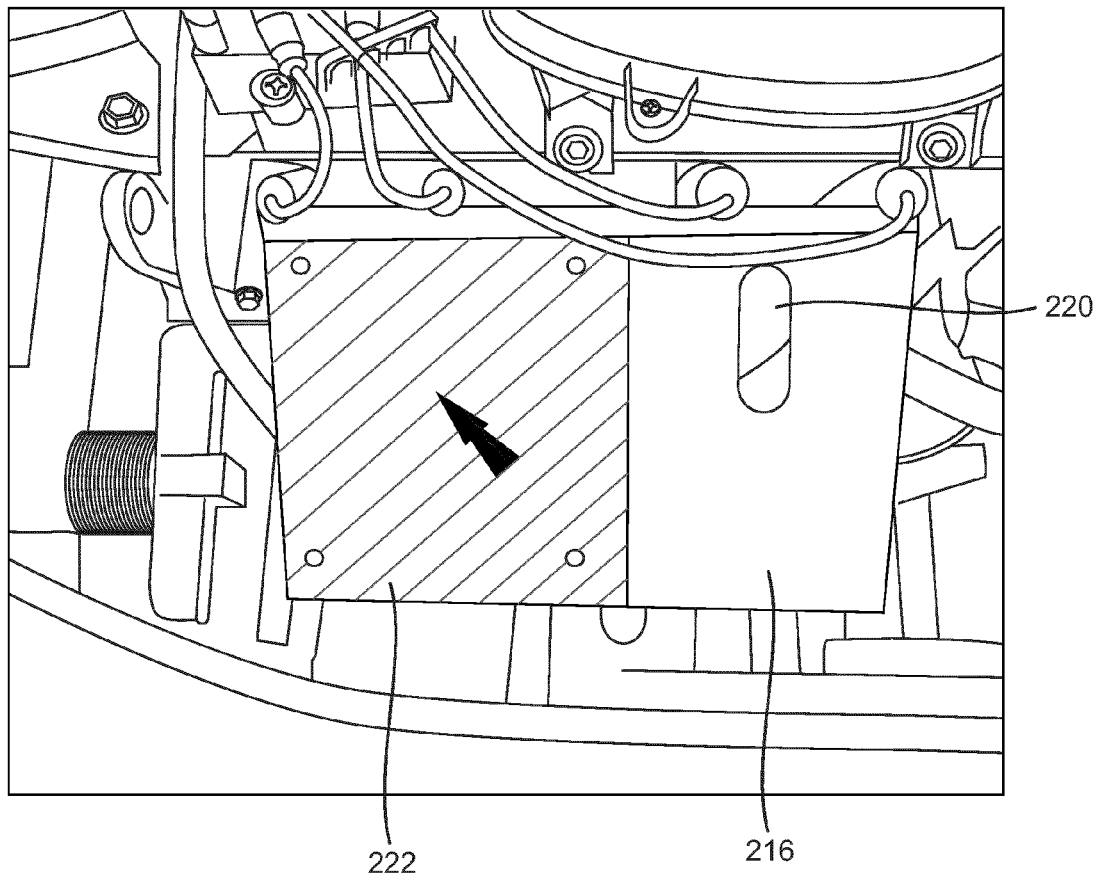
FIG. 12 is a perspective view of a mounting device for the electric motor according to an exemplary embodiment shown with a heat shield.

Referring to FIG. 12, to further reduce the likelihood that electric motor 104 will overheat due to its proximity to internal combustion engine 102, and particularly to the exhaust manifold, a heat shield 222 is provided between motor mounting bracket 216 and electric motor 104. Heat shield 222 may be any of a variety of materials suitable to reduce the amount of heat passing to electric motor 104.

Referring to FIGS. 13A and 13B, the method of modifying the vehicle also includes the addition of an idler pulley 224. Idler pulley 224 is configured to be rotatably mounted to idler pulley bracket 212 which has been mounted onto the engine block. Idler pulley 224 may be used as a belt tensioning pulley and its position may be adjustable to control the tensioning of the belts (e.g., idler pulley 224 may be adjustable in a substantially vertical direction, etc.).

Figure 14:
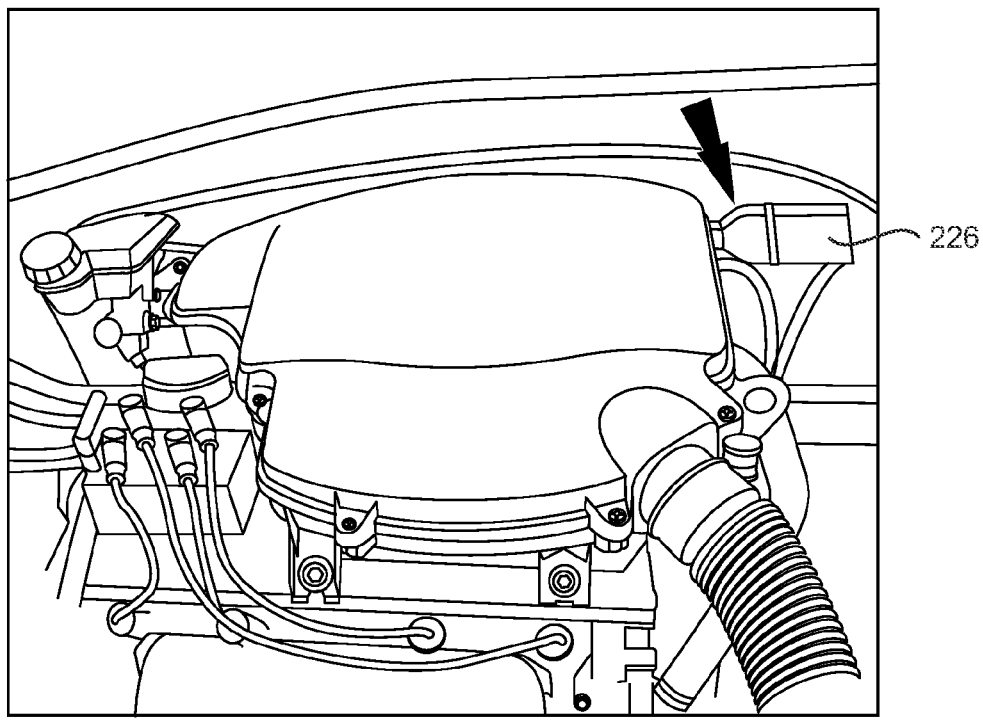
FIG. 14 is a perspective view of a fuel switch of the hybrid drive system mounted within the vehicle according to an exemplary embodiment.

Referring to FIG. 14, the method of modifying the vehicle also includes installing a fuel switch 226 on the vehicle. Fuel switch 226 functions as a cut off device for restricting the supply of fuel to the fuel injectors of internal combustion engine 102. Fuel switch 226 is coupled to and controlled by motor control unit 106, which may be programmed to stop internal combustion engine 102 by moving fuel switch 226 from an open position to a closed position. According to an exemplary embodiment, motor control unit 106 is configured to move fuel switch 226 into the closed position in at least two situations.

A first situation in which fuel switch 226 may be used is if internal combustion engine 102 is running and the vehicle has not moved for a predetermined period of time. In such a situation, motor control unit 106 sends a signal to fuel switch 226 to stop the flow of fuel to internal combustion engine 102 thereby turning off internal combustion engine 102. In such a configuration, motor control unit 106 and fuel switch 226 bypass the engine management system which is likely providing a signal to supply fuel to internal combustion engine 102. Once motor control unit 106 receives a signal that the vehicle is to move, fuel switch 226 is returned to an open position and the supply of fuel to internal combustion engine 102 is resumed.

A second situation in which fuel switch 226 may be used is if the vehicle is moving but does not require the torque output from internal combustion engine 102. For example, internal combustion engine 102 may not be needed when the vehicle is coasting downhill because although the vehicle is moving, there is no torque demand on internal combustion engine 102. During such an occurrence, internal combustion engine 102 is likely operating below its idle speed. In such a situation, motor control unit 106 sends a signal to fuel switch 226 to stop the flow of fuel to internal combustion engine 102 thereby turning off internal combustion engine 102. When motor control unit 106 receives a signal that internal combustion engine 102 has resumed to its idle speed, fuel switch 226 is returned to an open position and the supply of fuel to internal combustion engine 102 is resumed.

Figure 15:
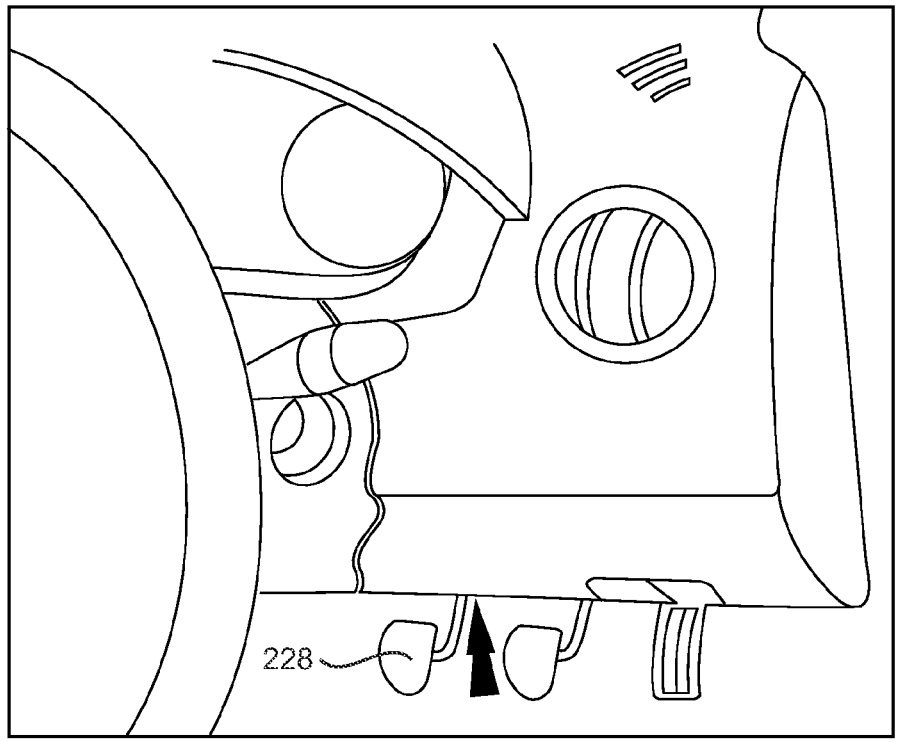
FIG. 15 is a perspective view of a pedal layout of the vehicle according to an exemplary embodiment.

Referring to FIG. 15, the method of modifying the vehicle may optionally include installing a switch under clutch pedal 228 of the vehicle that will allow a user to start the vehicle without having to turn the key in the ignition. Rather than having to turn the key, a user simply depresses clutch pedal 228 to activate the switch under the pedal. Activation of the switch starts electric motor 104 which is used to crank internal combustion engine 102. For larger vehicle applications (e.g., greater than approximately 1.4 liters) and/or diesel applications, where electric motor 104 may not be able to provide sufficient torque for cranking internal combustion engine 102, the same switch may be used to activate the existing starting motor on the vehicle for cranking internal combustion engine 102.

Figure 16:
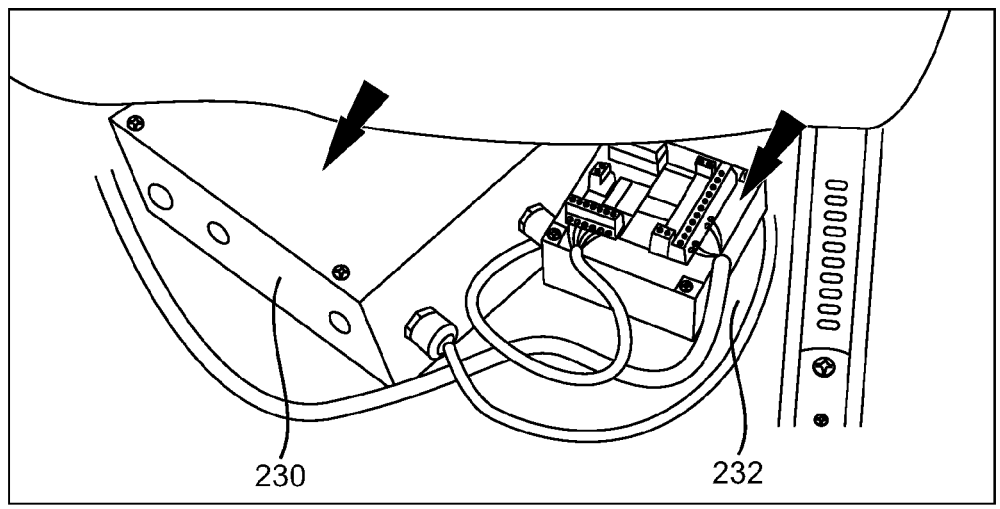
FIG. 16 is a perspective view of a junction box and isolator of the hybrid drive system according to an exemplary embodiment.
Figure 17:
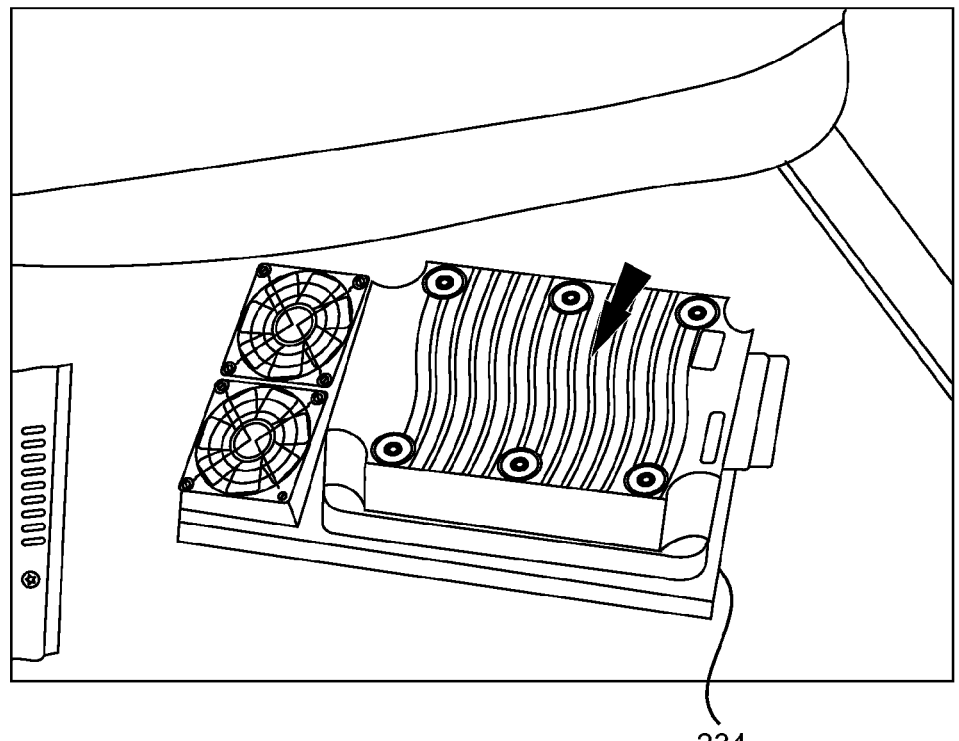
FIG. 17 is a perspective view of a motor control unit of the hybrid drive system according to an exemplary embodiment.
Figure 18:
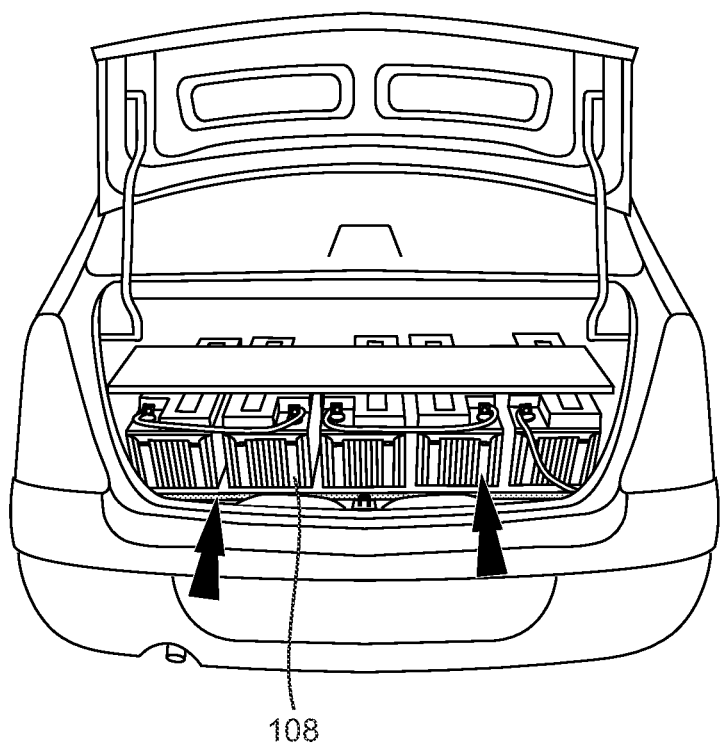
FIG. 18 is a perspective view of an energy storage device of the hybrid drive system according to an exemplary embodiment.

Referring to FIGS. 16 and 17, the method of modifying the vehicle also includes installing motor control unit 106 within the vehicle. This may include installing an injunction box 230, an isolator 232 and/or a control module 234 within the vehicle. According to the embodiment illustrated, injunction box 230 and isolator 232 are shown as being positioned under a driver seat of the vehicle, while control module 234 is shown as being positioned under a passenger seat of the vehicle. According to other embodiments, junction box 230, isolator 232 and control module 234 may be provided in a variety of locations within the vehicle. For example, junction box 230, isolator 232 and control module 234 may all be configured to fit under the dashboard of the vehicle. FIG. 21 is a schematic diagram of an electrical routing of hybrid drive system 100 that shows the inputs and outputs of the various components of hybrid drive system 100, including junction box 230, an isolator 232 and/or a control module 234.

Referring to FIGS. 16 and 17, the method of modifying the vehicle also includes installing motor control unit 106 within the vehicle. This may include installing a junction box 230, an isolator 232 and/or a control module 234 within the vehicle. According to the embodiment illustrated, junction box 230 and isolator 232 are shown as being positioned under a driver seat of the vehicle, while control module 234 is shown as being positioned under a passenger seat of the vehicle. According to other embodiments, junction box 230, isolator 232 and control module 234 may be provided in a variety of locations within the vehicle. For example, junction box 230, isolator 232 and control module 234 may all be configured to fit under the dashboard of the vehicle. FIG. 21 is a schematic diagram of an electrical routing of hybrid drive system 100 that shows the inputs and outputs of the various components of hybrid drive system 100, including junction box 230, an isolator 232 and/or a control module 234.

Figure 19:
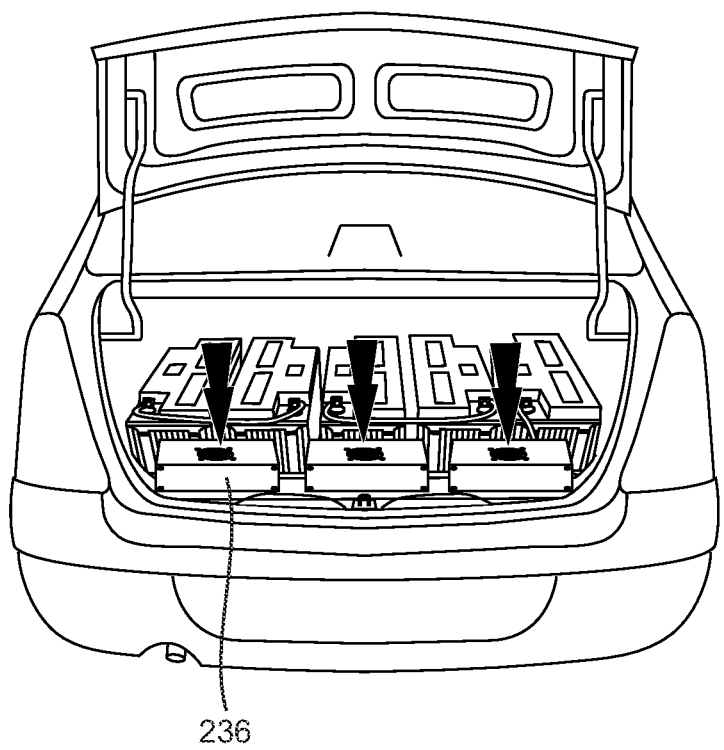
FIG. 19 is a perspective view of a charger of the hybrid drive system according to an exemplary embodiment.

Referring to FIG. 19, the method of modifying the vehicle also includes installing a separate charger 236 in the trunk of the vehicle that enables a user to selectively charge battery 108 when the vehicle is not in use. Charger 236 includes a connector (e.g., plug, etc.) that is configured to be selectively plugged-in to an electrical outlet by a user when the vehicle is not in use. While charger 236 is shown as being positioned within the trunk above battery 108, but alternatively, may be consolidated in size and supported along a sidewall of the trunk so that there remains sufficient space within the trunk for storage.

Figure 20:
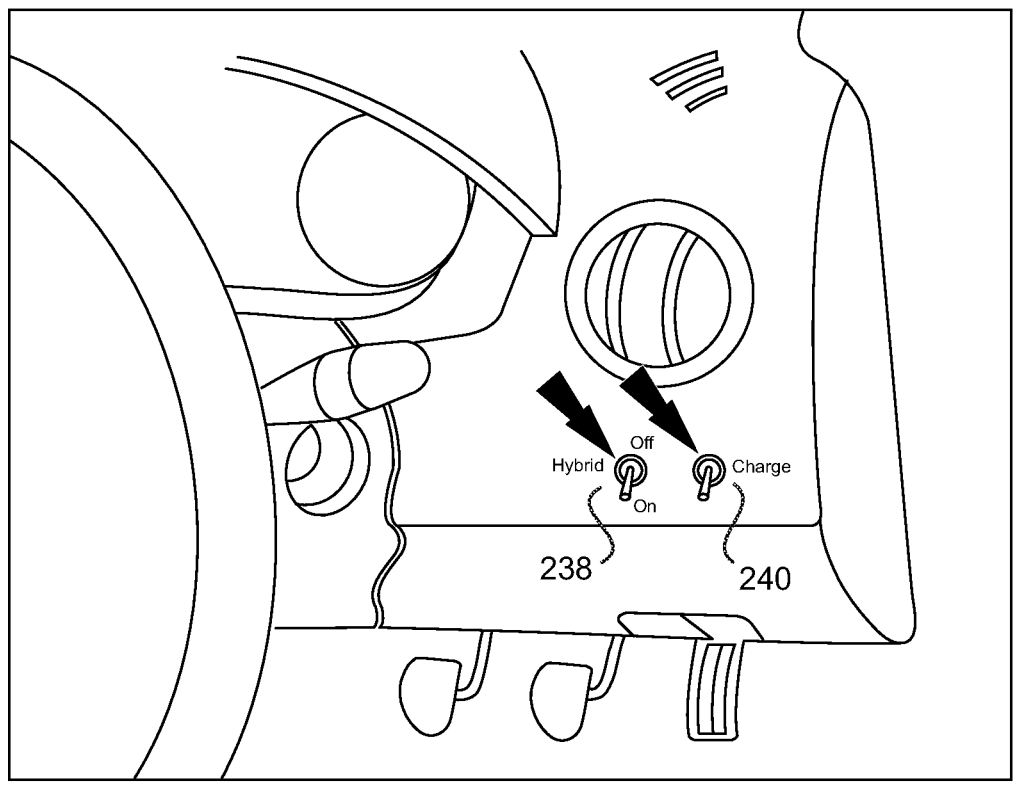
FIG. 20 is a perspective view of an optional user interface and display of the hybrid drive system according to an exemplary embodiment.

Referring to FIG. 20, the method of modifying the vehicle may optionally include installing a first user interface 238 and/or a second user interface 240 within the vehicle. According to the embodiment illustrated, first user interface 238 and second user interface 240 are both mounted on a dashboard of the vehicle, but alternatively, may be provided in any of a number of areas throughout the vehicle (e.g., center console, overhead system, side panel, etc.). First user interface 238 and second user interface 240 are both switches configured to be selectively moved by a user between an on position and an off position. First user interface 238 allows a user to control whether hybrid drive system 100 is turned on or off. If hybrid drive system 100 is turned off, the vehicle will simply operate as a non-hybrid vehicle. Second user interface 240 allows a user to selectively control when battery 108 is being charged. As indicated above, first user interface 238 and second user interface 240 are optional. As such, hybrid drive system 100 can function without allowing a user to have direct control over when the vehicle is operating in a hybrid mode and/or when battery 108 is being charged.

It should also be understood FIGS. 1A through 22 merely illustrate one embodiment of a vehicle that can receive hybrid drive system 100 and one embodiment of hybrid drive system. Hybrid drive system 100 has been provided as a kit to simplify the conversion process. The kit generally includes electric motor 104, motor control unit 106, battery 108, hybrid drive system pulley 204, idler pulley bracket 212, vertical bracket 214, motor mounting bracket 216, air conditioner compressor bracket 218, idler pulley 224, fuel switch 226, the switch for under clutch pedal 228, injunction box 230, isolator 232, control module 234 and charger 236. According to other embodiments, hybrid drive system 100 may be provided as individual components and/or a combination of one or more of any of the components detailed above.

Figure 23:
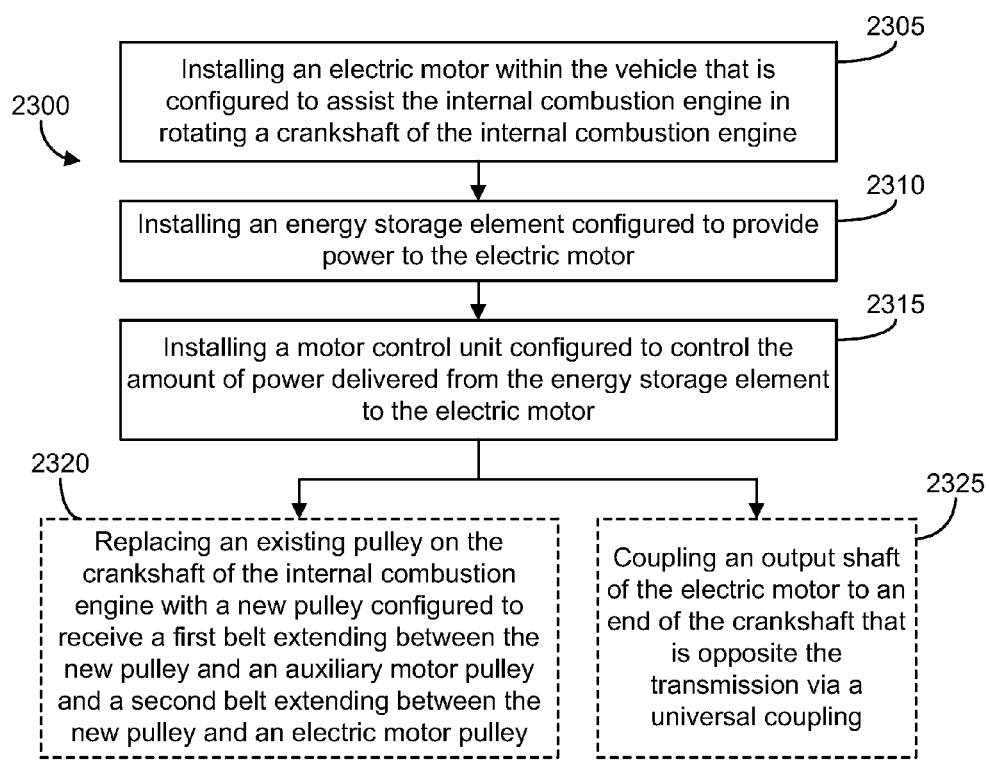
FIG. 23 is a flowchart of a method of converting a vehicle having an internal combustion engine and a transmission into a hybrid vehicle according to an exemplary embodiment.

FIG. 23 illustrates a flowchart of a method 2300 of converting a vehicle having an internal combustion engine and a transmission into a hybrid vehicle according to an exemplary embodiment. In some embodiments, the vehicle may have an alternator and a battery. Method 2300 includes installing an electric motor within the vehicle that is configured to assist the engine in rotating a crankshaft of the engine (2305). Method 2300 further includes installing an energy storage element configured to provide power to the electric motor (2310). Method 2300 further includes installing a motor control unit configured to control the amount of power delivered from the energy storage element to the electric motor (2315). In some embodiments, method 2300 may include replacing an existing pulley on the crankshaft of the engine with a new pulley configured to receive a first belt extending between the new pulley and an auxiliary motor pulley and a second belt extending between the new pulley and an electric motor pulley (2320). In other embodiments, method 2300 may include coupling an output shaft of the electric motor to an end of the crankshaft that is opposite the transmission via a universal coupling (2325).

It is important to note that the construction and arrangement of the elements of the hybrid drive system and the vehicle as shown in the illustrated embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, or the length or width of the structures and/or members or connectors or other elements of the system may be varied. Also, hybrid drive system 100 may be programmed to operate in any of a number of suitable ways depending on the needs of a particular application. Further, similar to the hybrid drive system illustrated in FIG. 1A, the hybrid drive system illustrated in FIG. 1B may be used with front-wheel, rear-wheel and/or all-wheel drive vehicles. Further still, if the hybrid drive system is provided as a kit, such kit may include any of a number of additional sensors and/or hardware to allow the system to be coupled to the vehicle. It should be noted that the elements and/or assemblies of the system may be constructed from any of a wide variety of materials that provide sufficient strength or durability, in any of a wide variety of colors, textures and combinations. Accordingly, all such modifications are intended to be included within the scope of the present inventions. Other substitutions, modifications, changes and omissions may be made in the design, operating conditions and arrangement of the preferred and other exemplary embodiments without departing from the spirit of the present inventions.

The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the inventions as expressed in the appended claims.

What is claimed is:

1. A method of converting a vehicle having an internal combustion engine, a transmission, an alternator and a battery into a hybrid vehicle, the method comprising:
    installing an electric motor within the vehicle that is configured to assist the internal combustion engine in rotating a crankshaft of the internal combustion engine;
    installing an energy storage element configured to provide power to the electric motor;
    installing a motor control unit configured to control the amount of power delivered from the energy storage element to the electric motor; and
    replacing an existing pulley on the crankshaft of the internal combustion engine with a new pulley configured to receive a first belt extending between the new pulley and an auxiliary motor pulley and a second belt extending between the new pulley and an electric motor pulley.

2. The method of claim 1 further comprising removing a manifold heat shield from the internal combustion engine and coupling a mounting bracket in the same location for supporting the electric motor.

3. The method of claim 2 wherein the mounting bracket includes one or more openings to promote air flow around the electric motor.

4. The method of claim 2 further comprising applying a heat shield between the mounting bracket and the electric motor.

5. The method of claim 1 further comprising installing a switch device configured to cut off a supply of fuel to the internal combustion engine based on a signal received from the motor control unit.

6. The method of claim 1 further comprising installing a switch device under a clutch pedal of the vehicle that causes the electric motor to crank the internal combustion engine when activated.

7. The method of claim 1 further comprising installing a plug-in charger within the vehicle that allows a user to charge the energy storage element when the vehicle is not in use.

8. The method of claim 1 wherein the auxiliary motor pulley comprises an alternator pulley.

9. A method of converting a vehicle having an internal combustion engine and a transmission into a hybrid vehicle, the method comprising:
   installing an electric motor within the vehicle that is configured to assist the internal combustion engine in rotating a crankshaft of the internal combustion engine;
   coupling an output shaft of the electric motor to an end of the crankshaft that is opposite the transmission via a universal coupling, wherein an end of the output shaft of the electric motor is positioned opposite the end of the crankshaft, and wherein the universal coupling is configured to compensate for misalignment between the output shaft of the electric motor and the crankshaft of the internal combustion engine;
   installing an energy storage element configured to provide power to the electric motor; and
   installing a motor control unit configured to control the amount of power delivered from the energy storage element to the electric motor.

10. The method of claim 9 wherein the step of coupling an output shaft of the electronic motor to an end of the crankshaft that is opposite the transmission via universal coupling comprises coupling the output shaft of the electric motor to a pulley rotatably coupled to the internal combustion engine.

11. The method of claim 9 further comprising connecting a belt between the pulley and at least one of a first auxiliary pulley and a second auxiliary pulley.

12. The method of claim 11 wherein the first auxiliary pulley comprises an alternator pulley and the second auxiliary pulley comprises a compressor pulley for an air conditioning system.

13. The method of claim 9 further comprising attaching one or more mounting brackets within the vehicle to at least partially support the electric motor.

14. The method of claim 13 further comprising supporting the electric motor at least partially by the vehicle body.

15. The method of claim 9 further comprising installing a switch device configured to cut off a supply of fuel to the internal combustion engine based on a signal received from the motor control unit.

16. The method of claim 9 further comprising installing a switch device under a clutch pedal of the vehicle that causes the electric motor to crank the internal combustion engine when activated.

17. The method of claim 9 further comprising installing a plug-in charger within the vehicle that allows a user to charge the energy storage element when the vehicle is not in use.

18. The method of claim 9 further comprising removing and eliminating a need for at least one of an existing battery and an alternator from the vehicle.

* * * * *